US010438323B2

(12) United States Patent
Senzaki et al.

(10) Patent No.: US 10,438,323 B2
(45) Date of Patent: Oct. 8, 2019

(54) IMAGE BRIGHTNESS CORRECTION AND NOISE SUPPRESSION METHOD, DEVICE, AND RECORDING MEDIUM FOR STORING IMAGE PROCESSING PROGRAM

(71) Applicant: NEC Corporation, Minato-ku, Tokyo (JP)

(72) Inventors: Kenta Senzaki, Tokyo (JP); Masato Toda, Tokyo (JP)

(73) Assignee: NEC CORPORATION, Tokyo (JP)

(*) Notice: Subject to any disclaimer, the term of this patent is extended or adjusted under 35 U.S.C. 154(b) by 282 days.

(21) Appl. No.: 15/507,803

(22) PCT Filed: Sep. 17, 2015

(86) PCT No.: PCT/JP2015/004778
§ 371 (c)(1),
(2) Date: Mar. 1, 2017

(87) PCT Pub. No.: WO2016/051716
PCT Pub. Date: Apr. 7, 2016

(65) Prior Publication Data
US 2017/0287116 A1    Oct. 5, 2017

(30) Foreign Application Priority Data

Sep. 29, 2014    (JP) ................................. 2014-197732

(51) Int. Cl.
*G06K 9/40*    (2006.01)
*G06T 5/00*    (2006.01)
(Continued)

(52) U.S. Cl.
CPC ............ *G06T 5/002* (2013.01); *G06K 9/4604* (2013.01); *G06T 5/009* (2013.01); *G06T 5/20* (2013.01);
(Continued)

(58) Field of Classification Search
CPC ........... G06T 5/002; G06T 5/009; G06T 5/20; G06T 7/13; G06T 2207/20016;
(Continued)

(56) References Cited

U.S. PATENT DOCUMENTS 9,135,685 B2*  9/2015  Senzaki ................. G06T 5/002
9,501,711 B2* 11/2016  Senzaki ................. G06T 5/002
(Continued)

FOREIGN PATENT DOCUMENTS

| JP | WO2013027723 | * | 2/2013 | ............... G06T 5/00 |
| WO | 2006/025486 A1 | | 3/2006 | |
| WO | 2013/161840 A1 | | 10/2013 | |

OTHER PUBLICATIONS

Toda et al., "High Dynamic Range Rendering for YUV Images with a Constraint on Perceptual Chroma Preservation", Nov. 2009, IEEE, 16th Int. Conf. on Image Processing, p. 1817-1820. (Year: 2009).*
(Continued)

*Primary Examiner* — Vincent Rudolph
*Assistant Examiner* — Timothy Choi

(57) ABSTRACT

The present invention provides an image processing method, an image processing device, and an image processing program which require low computing costs and with which it is possible to minimize noise amplification and halo generation caused by HDR. An image processing device according to one embodiment of the present invention has: a multi-resolution image generation means for generating a multi-resolution image; a correction amount calculation means for calculating a brightness correction amount on the basis of a lowest-resolution image of the multi-resolution image, a differential image between adjacent resolutions of the multi-resolution image, and edge information calculated at each resolution of the multi-resolution image; and a noise suppression means for calculating, on the basis of the lowest-resolution image, the differential image between
(Continued)

adjacent resolutions, the edge information, and the brightness correction amount, an image after brightness correction in which a noise component is suppressed.

8 Claims, 12 Drawing Sheets

(51) Int. Cl.
*H04N 1/409* (2006.01)
*G06T 7/13* (2017.01)
*G06K 9/46* (2006.01)
*G06T 5/20* (2006.01)
*H04N 1/407* (2006.01)
*H04N 5/235* (2006.01)

(52) U.S. Cl.
CPC ............... *G06T 7/13* (2017.01); *H04N 1/409* (2013.01); *H04N 1/4072* (2013.01); *G06T 2207/20016* (2013.01); *G06T 2207/20208* (2013.01); *H04N 1/407* (2013.01); *H04N 1/4092* (2013.01); *H04N 5/2355* (2013.01)

(58) Field of Classification Search
CPC ........ G06T 2207/20208; G06K 9/4604; H04N 1/407; H04N 1/4072; H04N 1/409; H04N 1/4092; H04N 5/2355
See application file for complete search history.

(56) References Cited

U.S. PATENT DOCUMENTS

| 2003/0215153 | A1* | 11/2003 | Gindele | G06K 9/40 |
| | | | | 382/254 |
| 2014/0205202 | A1* | 7/2014 | Toda | H04N 1/409 |
| | | | | 382/275 |
| 2015/0221068 | A1* | 8/2015 | Martensson | G06T 5/002 |
| | | | | 382/255 |

OTHER PUBLICATIONS

Belfiore et al., "Robust and Edge-Preserving Video Error Concealment by Coarse-To-Fine Block Replenishment", May 2002, IEEE, Int. Conf. on Acoustics, Speech, and Signal Processing, p. 3281-3284 (Year: 2002).*
Meier et al., "Reduction of Blocking Artifacts in Image and Video Coding", Apr. 1999, IEEE, Transactions on Circuits and Systems for Video Technology, vol. 9, iss. 3, p. 490-500. (Year: 1999).*
Al-Fahoum et al., "Combined Edge Crispiness and Statistical Differencing for Deblocking JPEG Compressed Images", Sep. 2001, IEEE, Transactions on Image Processing, vol. 10, iss. 9, p. 1288-1298. (Year: 2001).*
International Search Report for PCT Application No. PCT/JP2015/004778, dated Dec. 22, 2015.
English translation of Written opinion for PCT Application No. PCT/JP2015/004778.

* cited by examiner

IMAGE BRIGHTNESS CORRECTION AND NOISE SUPPRESSION METHOD, DEVICE, AND RECORDING MEDIUM FOR STORING IMAGE PROCESSING PROGRAM

This application is a National Stage Entry of PCT/JP2015/004778 filed on Sep. 17, 2015, which claims priority from Japanese Patent Application 2014-197732 filed on Sep. 29, 2014, the contents of all of which are incorporated herein by reference, in their entirety.

TECHNICAL FIELD

The present invention relates to an image processing method, an image processing device, and a storage medium for storing an image processing program.

BACKGROUND ART

Over recent years, usage of monitoring cameras becomes popular. However, in a case where a monitoring camera is actually used, when taking a video against light, there occurs a problem that a part of an area becomes dark and difficult to see and the video which is taken becomes blurred.

As a technique of correcting an image in a backlit state in a taken image, there is a technique (gradation correction, backlight correction, High Dynamic Range imaging, HDR) disclosed in PTL 1, for example.

The technique described in PTL 1 will be described. According to this technique, using a processing flow illustrated in FIG. 1, a backlit portion in an image is corrected.

First, the image processing system described in PTL 1 selects a local area that is an image area including one or more pixels from an input original image (step S801).

Next, the image processing system calculates a gradation correction amount of the selected local area (step S802). The image processing system calculates, in order to calculate the gradation correction amount of the local area, a luminance (peripheral area luminance) of an area (peripheral area) including the local area in which a center of the local area is set as an origin. As this peripheral area luminance, a median or average value of a luminance histogram of the peripheral area or a weighted average luminance value that is a weighted average of luminances of the peripheral area can be used. Then, the image processing system calculates a gradation correction amount of the local area on the basis of the peripheral area luminance.

When the gradation correction amount of the local area is calculated, the image processing system corrects a related gradation of the local area on the basis of the obtained local gradation correction amount (step S803). This local gradation correction is sequentially executed for one or more local areas.

The image processing system determines whether the gradation correction of a local area has been executed for all the local areas as correction targets (step S804). When an unprocessed local area remains (step S804—NO), the image processing system acquires a correction amount for the area and executes gradation correction therefor.

When processing is finished for all the local areas (step S804—YES), the image processing system terminates gradation correction processing.

CITATION LIST

Patent Literature

PTL 1: PCT International Publication No. WO2006/025486

SUMMARY OF INVENTION

Technical Problem

However, the technique of PTL 1 amplifies noise by gradation correction processing, i.e. HDR processing, and it is therefore difficult to generate a clear output image when a noise intensity included in an input image is high (i.e. when variance of noise is large). When noise suppression processing (i.e. denoise processing) is introduced in a front stage or latter stage of HDR processing, noise amplification may be suppressed, but denoise processing needs almost the same calculation cost as for HDR processing. Therefore, in an environment, such as an FPGA (field-programmable gate array), where a calculation resource is limited, it is difficult to make an application without reducing a calculation load by decreasing calculation performance or enhancing a calculation resource.

Further, in the technique of PTL 1, when a linear low-pass filter having low calculation cost is used in an illumination light component estimation unit, a problem referred to as a halo due to an illumination light component estimation error occurs in an edge peripheral area in an image in which brightness drastically changes. When an illumination light component is estimated using an edge preservation-type non-linear low-pass filter, it is possible to reduce an error of illumination light component estimation in an edge periphery, and a halo problem is unlikely to occur. However, a calculation cost of an edge preservation-type non-linear low-pass filter is high, and therefore it is difficult to singly use a non-linear low-pass filter in an environment, such as an FPGA, where a calculation resource is limited.

The present invention is made in view of the above-described problem. One of the objects of the present invention is to provide an image processing method, an image processing device, an image processing program, and the like capable of suppressing, with low calculation cost, noise amplification and halo generation caused by HDR.

Solution to Problem

An image processing device according to an aspect of the present invention includes: multi-resolution image generation means for generating a multi-resolution image; correction amount calculation means for calculating a brightness correction amount on the basis of a lowest resolution image of the multi-resolution image, an inter-adjacent resolution differential image in the multi-resolution image, and edge information calculated at each resolution of the multi-resolution image; and noise suppression means for calculating an image after brightness correction where a noise component is suppressed on the basis of the lowest resolution image, the inter-adjacent resolution differential image, the edge information, and the brightness correction amount.

An image processing device according to an aspect of the present invention includes: multi-resolution image generation means for generating a multi-resolution image that is an aggregation of a plurality of images having different resolutions by calculating average pixel values in reference pixel ranges of a plurality of sizes, the reference pixel ranges being pixel ranges to be referred to and becoming sequentially narrower or broader, centers of the reference pixel ranges being a target pixel; difference calculation means for calculating an inter-adjacent resolution differential value representing a difference between adjacent resolutions by using the multi-resolution image; edge direction determination means for determining edge directions of the reference pixel ranges of a plurality of sizes used when generating the multi-resolution image; average value calculation means for dividing the reference pixel ranges into three sub-blocks based on the edge directions, and calculating a sub-block average value that is an average value for each of the sub-blocks; illumination light estimation means for extracting low-pass component at the target pixel by repeating: calculating a difference between an average pixel value of a reference pixel range at the resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount; correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution, and estimating an illumination light component in the target pixel based on the low-pass component; correction amount calculation means for calculating a brightness correction amount of an input image based on the illumination light component; and noise suppression means for calculating a pixel value, whose noise component is suppressed, of the target pixel after brightness correction by correcting a pixel value at the resolution concerned based on the correction amount for correcting a pixel value at the resolution concerned, the correction amount calculated in calculation of the brightness correction amount, and a brightness correction amount at the resolution concerned, by generating a pixel value at a resolution higher than the resolution concerned based on the corrected pixel value of the resolution concerned and the inter-adjacent resolution differential information, and by repeating generation of the pixel value at the resolution higher than the resolution concerned in order from a pixel value at a lowest resolution until generating a pixel value at a predetermined resolution.

An image processing method according to an aspect of the present invention includes: generating a multi-resolution image; calculating a brightness correction amount on the basis of a lowest resolution image of the multi-resolution image, an inter-adjacent resolution differential image in the multi-resolution image, and edge information calculated at each resolution of the multi-resolution image; and calculating an image after brightness correction where a noise component is suppressed on the basis of the lowest resolution image, the inter-adjacent resolution differential image, the edge information, and the brightness correction amount.

An image processing method according to an aspect of the present invention includes: generating a multi-resolution image that is an aggregation of a plurality of images having different resolutions by calculating average pixel values in reference pixel ranges of a plurality of sizes, the reference pixel ranges being pixel range to be referred to and becoming sequentially narrower or broader, centers of the reference pixel ranges being a target pixel; calculating inter-adjacent resolution differential information that is differential information between adjacent resolutions by using the multi-resolution image; determining edge directions of the reference pixel ranges of a plurality of sizes used when generating the multi-resolution image; dividing the reference pixel ranges into three sub-blocks based on the edge directions; calculating a sub-block average value that is an average value for each of the sub-blocks; extracting low-pass component at the target pixel by repeating: calculating a difference between an average pixel value of a reference pixel range at the resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount, correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution; estimating an illumination light component in the target pixel based on the low-pass component; calculating a brightness correction amount of an input image based on the illumination light component; and calculating a pixel value, whose noise component is suppressed, of the target pixel after brightness correction by correcting a pixel value at the resolution concerned based on the correction amount for correcting a pixel value at the resolution concerned, the correction amount calculated in calculation of the brightness correction amount, and a brightness correction amount at the resolution concerned, by generating a pixel value at a resolution higher than the resolution concerned based on the corrected pixel value of the resolution concerned and the inter-adjacent resolution differential information, and by repeating generation of the pixel value of a resolution higher than the resolution concerned in order from a pixel value at a lowest resolution until generating a pixel value at a predetermined resolution.

A computer-readable storage medium according to an aspect of the present invention stores a program causing a computer to execute: processing of generating a multi-resolution image; processing of calculating a brightness correction amount on the basis of a lowest resolution image of the multi-resolution image, an inter-adjacent resolution differential image in the multi-resolution image, and edge information calculated at each resolution of the multi-resolution image; and processing of calculating an image after brightness correction where a noise component is suppressed on the basis of the lowest resolution image, the inter-adjacent resolution differential image, the edge information, and the brightness correction amount. The present invention can be achieved by the program stored in the storage medium.

Advantageous Effects of Invention

According to the present invention, it is possible to provide an image processing method, an image processing device, and an image processing program, that are capable of suppressing, with low calculation cost, noise amplification and halo generation caused by brightness correction.

DESCRIPTION OF EMBODIMENTS

First Example Embodiment

Figure 1:
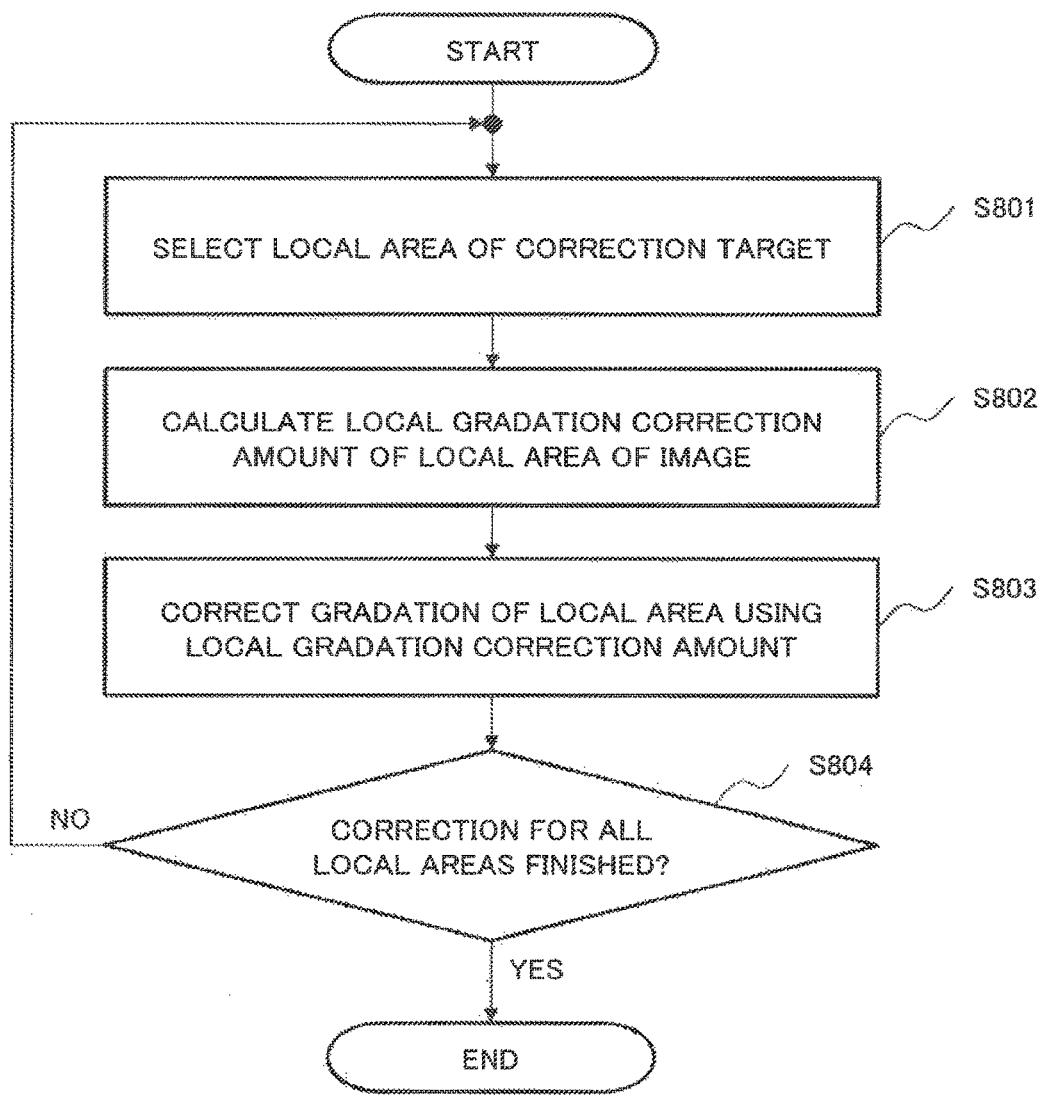
FIG. 1 is a flowchart illustrating an operation of a related backlight correction technique.

An image processing method according to a first example embodiment of the present invention generates a multi-resolution image. The image processing method calculates a brightness correction amount from a lowest resolution image of the multi-resolution image, an inter-adjacent resolution differential image in the multi-resolution image, and edge information calculated at each resolution of the multi-resolution image. The image processing method calculates an image after brightness correction, in which a noise component is suppressed, from the lowest resolution image, the inter-adjacent resolution differential image, the edge information, and the brightness correction value.

For more detailed description, the image processing method according to the first example embodiment of the present invention calculates average pixel values in reference pixel ranges, whose centers are a target pixel, of a plurality of sizes in which a pixel range to be referred to becomes sequentially narrower or broader, and generates a multi-resolution image that is an aggregation of a plurality of images having different resolutions. Using the multi-resolution image, it calculates inter-adjacent resolution differential information that is differential information between adjacent resolutions. The image processing method determines edge directions in the reference pixel ranges of a plurality of sizes used when generating the multi-resolution image. The image processing method divides the reference pixel ranges into three sub-blocks on the basis of the edge directions. The image processing method calculates a sub-block average value that is an average value of each of the sub-blocks. The image processing method calculates a difference between an average pixel value of a reference pixel range at the resolution and a pixel value related to the target pixel of the reference pixel range at the resolution, and an edge amount obtained from three sub-block average values in the reference pixel range of the resolution (a first calculation). The image processing method calculates a correction amount for correcting a pixel value at the resolution on the basis of the difference and the edge amount (a second calculation). The image processing method corrects the pixel value at the resolution on the basis of the correction value (a first correction). The image processing method calculates a pixel value at a resolution higher than the resolution from the corrected pixel value at the resolution and an inter-adjacent resolution difference value at the resolution (a third calculation). The image processing method repeats the first calculation, the second calculation, the first correction, and the third calculation in order from a pixel value at a lowest resolution until generating a pixel value at a predetermined resolution, and extracts a low-pass component in the target pixel. Note that in description of example embodiments of the present invention, a low-pass component in a pixel represents, for example, a pixel value in a pixel of an image of a low frequency component also obtained by applying a two-dimensional filter to an image. Further, a low-pass component of an image represents an image of a low frequency component of the image also obtained by applying a two-dimensional filter to the image. The image processing method estimates an illumination light component in the target pixel on the basis of the low-pass component. The image processing method calculates a brightness correction amount of an input image on the basis of the illumination light component. The image processing method corrects, on the basis of the correction amount for correcting a pixel value at the resolution calculated in the calculation of the brightness correction amount and the brightness correction amount at the resolution, the pixel value at the resolution. The image processing method generates a pixel value at a resolution higher than the resolution from the corrected pixel value at the resolution and the inter-adjacent resolution differential information. The image processing method repeats this generation in order from a pixel value at a lowest resolution until generating a pixel value at a predetermined resolution, and calculates a pixel value after brightness correction, in which a noise component is suppressed in the target pixel.

Hereinafter, a specific example of the first example embodiment of the present invention will be described.

Figure 2:
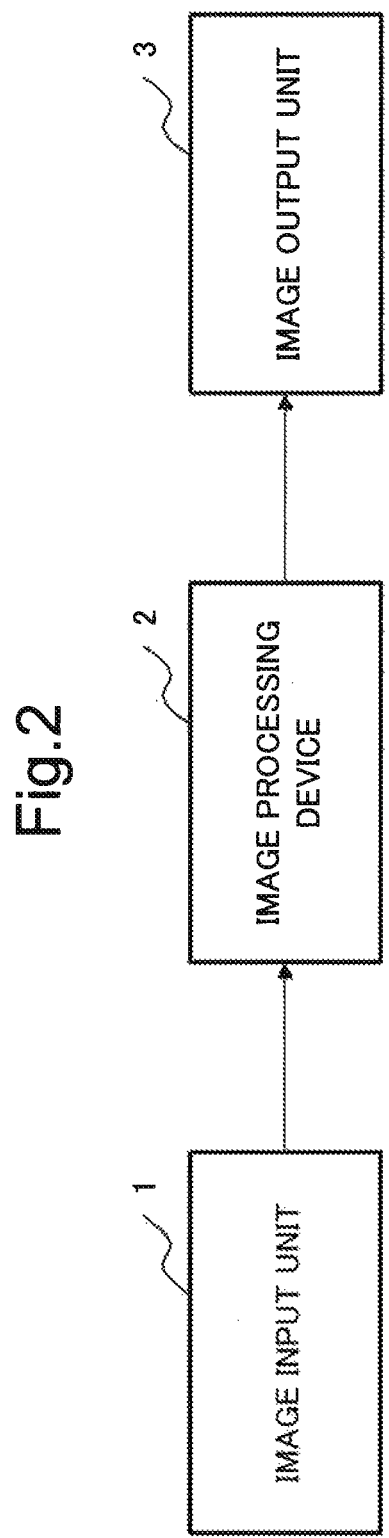
FIG. 2 is a block diagram illustrating an entire configuration of an image processing system according to a first example embodiment of the present invention.

FIG. 2 is a block diagram of a configuration of an image processing system of the first example embodiment of the present invention. The image processing system of the present example embodiment includes an image input unit 1, an image processing device 2, and an image output unit 3. In the image processing system illustrated in FIG. 2, a flow of data is not limited to a direction of an arrow.

The image input unit 1 is achieved by an imaging device such as a camera, and a scanner, or an image database on which image data is imaged by the imaging device and accumulated. The image input unit 1 may be achieved further by a network with which they are connected. Original image data is input from the image input unit 1 to the image processing device 2.

The image processing device 2 executes correction processing of improving visibility of a backlit portion of an input original image, and outputs the corrected image to the image output unit 3.

The image output unit 3 is achieved, for example, by a display, a printer, and a storage medium such as a hard disk or a memory card that holds image data. The image output unit 3 may be further or alternatively achieved further by a network with which they may be connected. The image output unit 3 displays, accumulates, or transmits an image.

Figure 3:
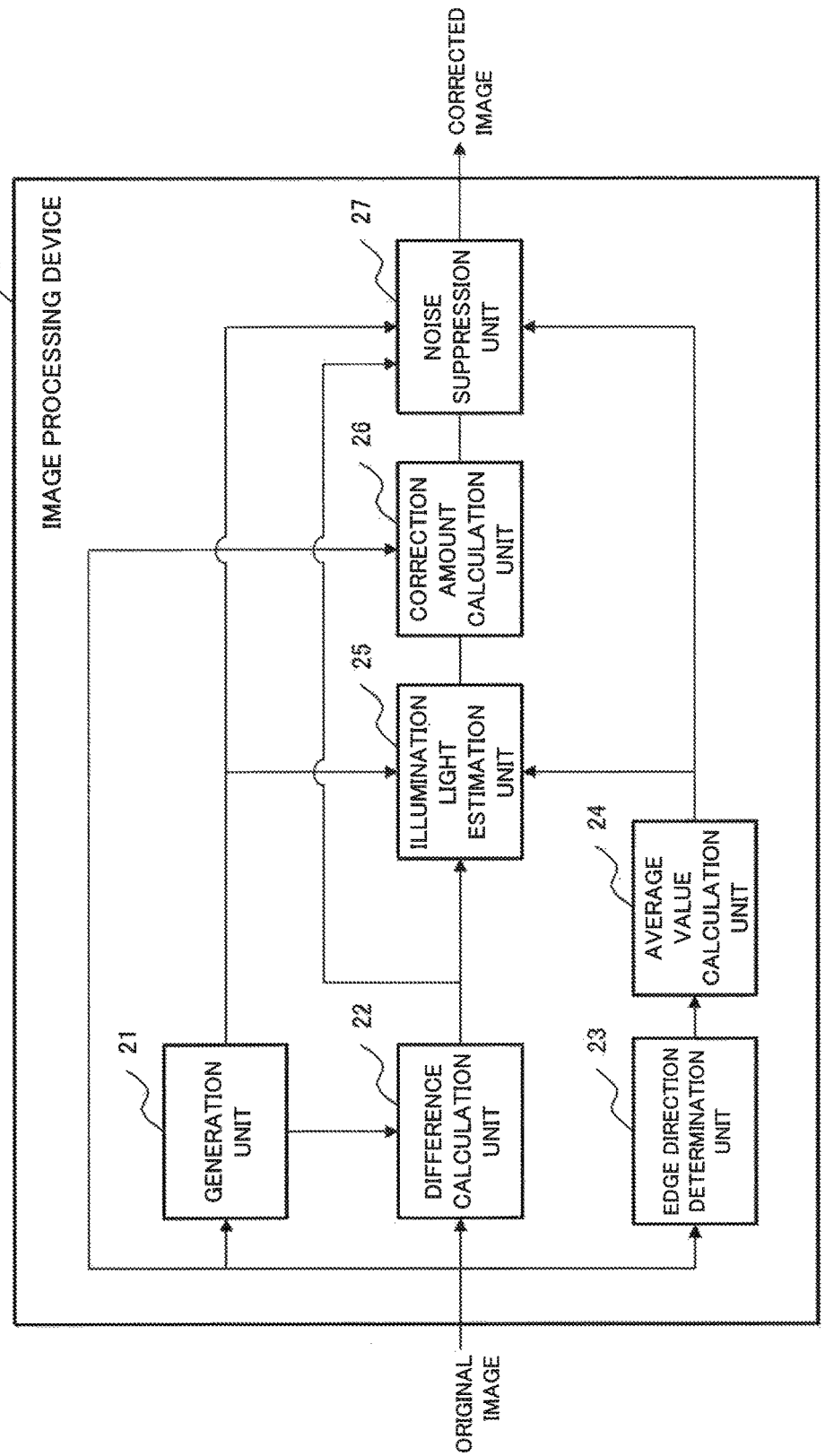
FIG. 3 is a block diagram illustrating a configuration of an image processing device 2 of the first example embodiment of the present invention.

FIG. 3 is a block diagram illustrating one example of a configuration of an image processing device 2 of the present example embodiment. The image processing device 2 includes, as illustrated in FIG. 3, a generation unit 21, a difference calculation unit 22, an edge direction determination unit 23, an average value calculation unit 24, an illumination light estimation unit 25, a correction amount calculation unit 26, and a noise suppression unit 27. Note that in the image processing device 2 illustrated in FIG. 3, a flow of data is not limited to a direction of an arrow.

Hereinafter, the respective units will be described.

The generation unit 21 calculates, for original image data input from the image input unit 1, average pixel values in reference pixel ranges of a plurality of sizes, whose centers are a target pixel and in which a pixel reference range becomes sequentially narrower (or broader) and thereby generates a multi-resolution image. The multi-resolution image is an aggregation of a plurality of images having different resolutions. The generation unit 21 outputs the generated multi-resolution image to the difference calculation unit 22. Further, the generation unit 21 outputs a lowest resolution image of the multi-resolution image to the illumination light estimation unit 25 and the noise suppression unit 27. The average pixel value is an arithmetic average value, a geometric average value, or a weighted average value of pixels existing in an area. In the following description, a case in which the average pixel value is an arithmetic average value of pixels existing in an area will be described.

The multi-resolution image is generated using a plurality of low-pass filters having different bandpass performances. Assuming that a pixel value in a target pixel position x=(x, y) of an input image u is denoted as u(x, y), a matrix representing an operator of an mth low-pass filter is denoted as $f_m$, and a radius of a reference range of a filter are designated as $k_m$, an output amount $l_m(x, y)$ of the low-pass filter is represented as following Equation (1). The output value $l_m(x, y)$ of the low-pass filter represents a pixel value $l_m(x, y)$ in a pixel position (x, y) at an mth resolution.

[Math. 1]

$$l_m(x, y) = \frac{1}{\sum_{i=-k_m}^{k_m} \sum_{j=-k_m}^{k_m} f_m(i, j)} \sum_{i=-k_m}^{k_m} \sum_{j=-k_m}^{k_m} f_m(i, j) \times u(x + i, y + j) \quad (1)$$

A filter coefficient (i.e. an element of the matrix $f_m$ representing an operator) $f_m(i,j)$ of the mth low-pass filter may be, for example, 1.0 (i.e. fm(i,j)=1.0). Alternatively, the generation unit 21 may determine a coefficient $f_m(i,j)$ of a filter on the basis of an isotropic two-dimensional normal distribution represented by following Equation (2).

[Math. 2]

$$f_m(i, j) = \exp\left\{-\frac{i^2 + j^2}{2\sigma^2}\right\} \quad (2)$$

The difference calculation unit 22 calculates a differential image between adjacent resolutions (i.e. generates an inter-adjacent resolution differential image) on the basis of the original image data input from the image input unit 1 and the multi-resolution image input from the generation unit 21. The difference calculation unit 22 outputs the generated inter-adjacent resolution differential image to the illumination light estimation unit 25 and the noise suppression unit 27.

The inter-adjacent resolution differential image is a difference between two images having resolutions adjacent to each other in a multi-resolution image. When an inter-adjacent resolution differential image is designated as $d_m(x)$, the inter-adjacent resolution differential image is represented as $d_m(x)=l_{m-1}(x)-l_m(x)$. Note that, for convenience, it is assumed that $l_{-1}(x)=u(x)$ is established, i.e. $l_{-1}(x)$ is an original image. Here, $d_m(x)$ includes a high-pass component including noise. Note that in description of the example embodiments of the present invention, a high-pass component of an image represents an image of a high frequency component of an image obtained, for example, by applying a two-dimensional high-pass filter to the image.

The edge direction determination unit 23 determines, on the basis of the original image data input from the image input unit 1, a direction of an edge in each reference pixel range referred to for calculating the multi-resolution image. Then, the edge direction determination unit 23 outputs the original image data input from the image input unit 1 and the determined edge direction to the average value calculation unit 24.

Figure 4:
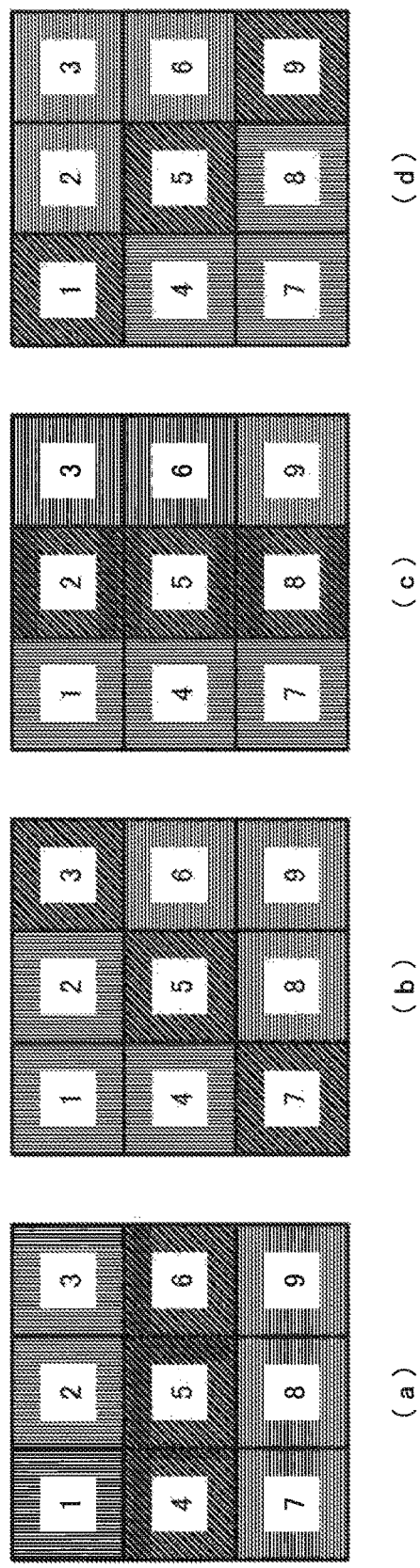
FIG. 4 is an example of a block pattern used when determining an edge direction.

The edge direction determination unit 23 divides the reference pixel ranges referred to for calculating the multi-resolution image into 3×3 blocks, respectively, and calculates an average pixel value in each of the blocks. The edge direction determination unit 23 selects one of four edge direction patterns illustrated in FIG. 4, and thereby determines an edge direction. FIG. 4 illustrates four edge direction patterns of an edge direction of a horizontal line ((a) of FIG. 4), a lower left oblique line ((b) of FIG. 4), a vertical line ((c) of FIG. 4), and a lower right oblique line ((d) of FIG. 4) in which the reference pixel ranges are divided into 3×3 blocks. The edge direction determination unit 23 may divide the reference pixel ranges into blocks of a number (e.g. 5×5) other than 3×3. A number of edge direction patterns may be a number (e.g. two or eight) other than four.

In determination of an edge direction, the edge direction determination unit 23 integrates the 3×3 blocks, into which the reference pixel ranges is divided, into three sub-blocks (an aggregation of blocks) of the patterns illustrated in FIG. 4. In the example illustrated in FIG. 4, blocks included in the same sub-block are represented by the same pattern. As illustrated in FIG. 4, each of the three sub-blocks includes three blocks. The edge direction determination unit 23 selects a pattern in which a variation of average pixel values in sub-blocks is minimum, for example, from the four patterns illustrated in FIG. 4, and thereby achieves a determination of an edge direction. The edge direction determination unit 23 calculates, as a variation of average pixel values in sub-blocks, for example, a total of absolute values of differences between average pixel values of adjacent blocks within a sub-block. A pattern in which a variation of average pixel values in sub-blocks is minimum is a pattern in a most dominant edge direction in an area of the sub-blocks.

Specific description will be made using FIG. 4. First, in a case where a reference pixel range is divided into 3×3 blocks, the nine blocks are designated as blocks 1 to 9. The reference pixel range includes 3×3 blocks illustrated in FIG. 4. When, for example, a variation of average pixel values of a sub-block including the blocks 1, 2, and 3, a sub-block including the blocks 4, 5, and 6, and a sub-block including the blocks 7, 8, and 9 is minimum, the edge direction determination unit 23 determines an edge direction of the reference pixel range as a horizontal direction. Further, when a variation of average pixel values of a sub-block including the blocks 1, 2, and 4, a sub-block including the blocks 3, 5, and 7, and a sub-block including the blocks 6, 8, and 9 is minimum, the edge direction determination unit 23 determines an edge direction of the reference pixel range as a lower left oblique direction. Further, when a variation of average pixel values of a sub-block including the blocks 1, 4, and 7, a sub-block including the blocks 2, 5, and 8, and a sub-block including the blocks 3, 6, and 9 is minimum, the edge direction determination unit 23 determines an edge direction of the reference pixel range as a vertical direction. Further, when a variation of average pixel values of a sub-block including the blocks 1, 5, and 9, a sub-block including the blocks 2, 3, and 6, and a sub-block including the blocks 4, 7, and 8 is minimum, the edge direction determination unit 23 determines an edge direction of the reference pixel range as a lower right oblique direction.

The average value calculation unit 24 integrates, on the basis of the original image data and the edge direction input from the edge direction determination unit 23, the 3×3 blocks into three sub-blocks in accordance with the selected edge direction pattern. When, for example, the edge direction is a horizontal direction, the average value calculation unit 24 integrates the nine blocks of the blocks 1 to 9 into a sub-block including the blocks 1, 2, and 3, a sub-block including the blocks 4, 5, and 6, and a sub-block including the blocks 7, 8, and 9. Then, the average value calculation unit 24 calculates an average pixel value for each of the sub-blocks, and outputs the calculated average pixel value for each of the sub-blocks to the illumination light estimation unit 25 and the noise suppression unit 27. For example, in the above-described example, the average value calculation unit 24 calculates an average pixel value of a sub-block including the blocks 1, 2, and 3, an average pixel value of a sub-block including the blocks 4, 5, and 6, and an average pixel value of a sub-block including the blocks 7, 8, and 9. The average value calculation unit 24 outputs the three calculated average pixel values to the illumination light estimation unit 25 and the noise suppression unit 27.

Note that in the following description, average pixel values of respective sub-blocks in an mth reference pixel range are referred to as $l_{m,0}(x)$, $l_{m,1}(x)$ and $l_{m,2}(x)$. Here, $l_{m,0}(x)$ and $l_{m,2}(x)$ represent average pixel values of sub-blocks of both ends, and $l_{m,1}(x)$ represents an average pixel value of a central sub-block.

The illumination light estimation unit 25 estimates an illumination light component in a target pixel position on the basis of a low resolution image, an inter-adjacent resolution differential image, and an average pixel value for each sub-block. As described above, the lowest resolution image is input from the generation unit 21. The inter-adjacent resolution differential image is input from the difference calculation unit 22. The average pixel value for each sub-block is input from the average value calculation unit 24. The estimated illumination light component is output to the correction amount calculation unit 26.

The illumination light estimation unit 25 corrects, in a target pixel in order from a pixel value at a lowest resolution (a pixel value generated from an average filter whose pixel reference range is widest), a pixel value at a resolution concerned on the basis of sub-block average value information of the resolution concerned. The illumination light estimation unit 25 further calculates, on the basis of the corrected pixel value at the resolution concerned and an inter-adjacent resolution differential value at the resolution concerned, a pixel value at a next lower resolution compared with the resolution concerned. The illumination light estimation unit 25 repeats this correction and calculation of a pixel value until generating (i.e. calculating) a pixel value at the same resolution as a resolution of an input image, and thereby extracts a low-pass component in which an edge in the target pixel position is preserved. The illumination light estimation unit 25 estimates the extracted low-pass component as an illumination light component.

Since processing executed by the illumination light estimation unit 25 at each resolution is the same except for an intensity parameter of the processing, in the following, processing for generating, on the basis of a lowest resolution image $l_2(x)$, a corrected image $l'_1(x)$ of a next higher resolution compared with the resolution will be described.

First, the illumination light estimation unit 25 calculates, for a target pixel x, a differential value g(x) between a lowest resolution pixel value $l_2(x)$ and a central block average pixel value $l_{2,1}(x)$ at a lowest resolution in accordance with Equation $g(x)=l_{2,1}(x)-l_2(x)$.

Next, the illumination light estimation unit 25 calculates, as an edge amount $e_2(x)$, for example, an absolute value of difference between $l_{2,0}(x)$ and $l_{2,2}(x)$ that are average pixel values of sub-blocks of both ends in accordance with the following equation.

$$e_2(x)=|l_{2,0}(x)-l_{2,2}(x)| \qquad \text{[Math. 3]}$$

Note that the illumination light estimation unit 25 may calculate, as an edge amount, a correction edge amount $e'_2(x)$ represented by the following equation in which a noise intensity $\sigma_2$ at the resolution is considered.

[Math. 4]

$$e_2'(x)=\max(|l_{2,0}(x)-l_{2,2}(x)|-\sigma_2,0.0) \qquad (3)$$

Hereinafter, description will be made using a correction edge amount $e'_2(x)$. In other words, a case in which the illumination light estimation unit 25 calculates a correction edge amount $e'_2(x)$ as an edge amount will be described.

The illumination light estimation unit 25 further sets a smaller value between an absolute value of a differential value g(x) and a value half of a correction edge amount $e'_2(x)$ as a correction value $h_1(x)$. Then, the illumination light estimation unit 25 adds, while considering a sign of g(x), the correction value $h_1(x)$ to the lowest resolution image $l_2(x)$, and thereby generates a corrected pixel value $l'_2(x)$ of the lowest resolution. The corrected pixel value $l'_2(x)$ of the lowest resolution is represented by the following equation. Note that sign (·) is a function representing a plus or minus sign.

[Math. 5]

$$l_2'(x)=l_2(x)+\text{sign}(g(x))\times h_1(x) \qquad (4)$$

Figure 5:
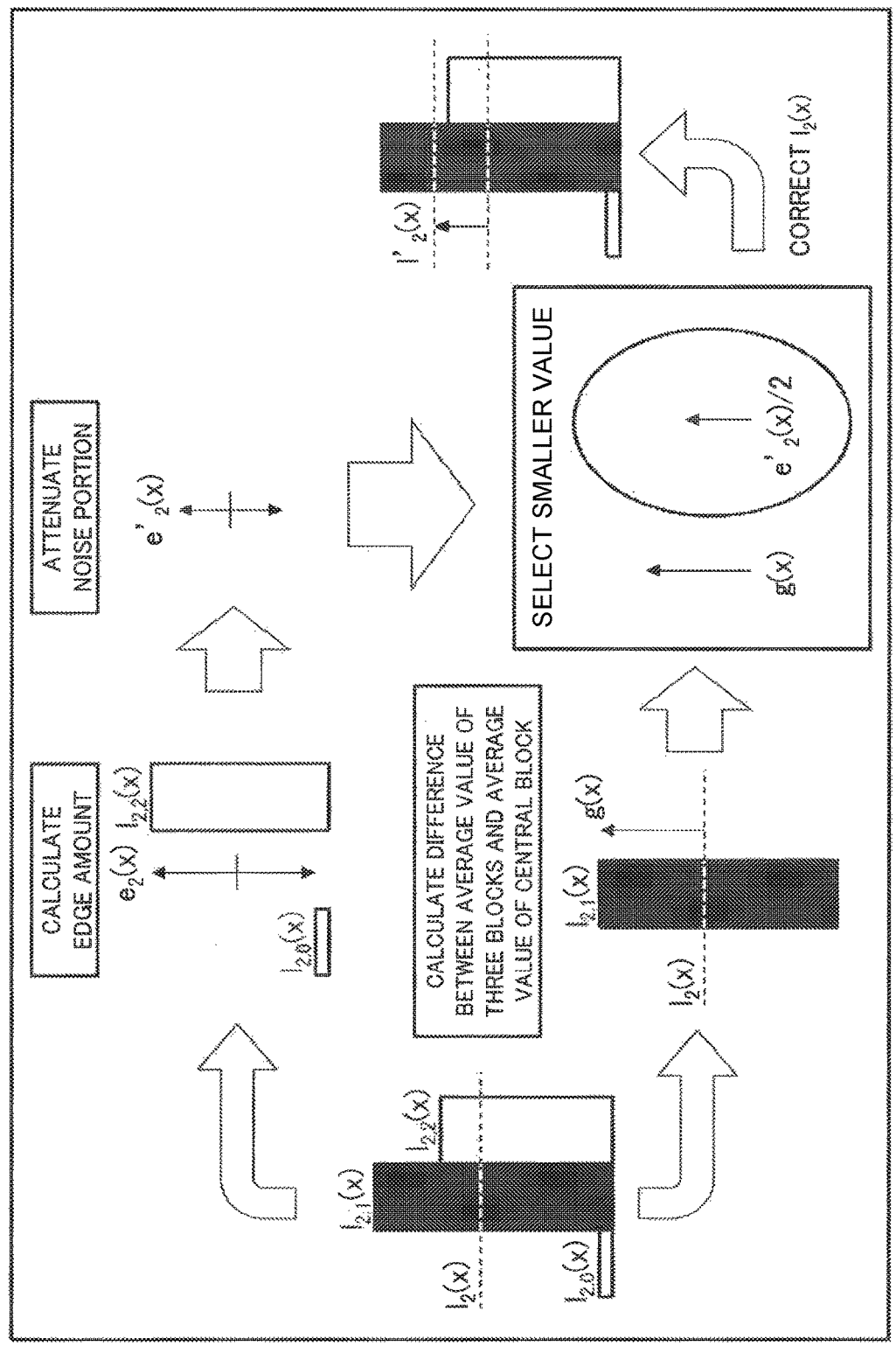
FIG. 5 is a diagram illustrating a flow of processing in a case where a relation among average pixel values of three sub-blocks is a concavo-convex type (a central sub-block is maximum or minimum).

The above processing will be described using corresponding figures. First, a case in which a relation among average pixel values $l_{2,0}(x)$, $l_{2,1}(x)$, and $l_{2,2}(x)$ of three sub-blocks is a concavo-convex type is considered. The concavo-convex type represents a pattern of average pixel values of three sub-blocks when an average pixel value $l_{2,1}(x)$ of a central sub-block is a maximum value of three average pixel values as illustrated in FIG. 5 or when being a minimum value of the three average pixel values. In this example, a target pixel is included in an edge. When a pattern of average pixel values of sub-blocks is a concavo-convex type, $e'_2(x)/2$ is certainly selected as $h_1(x)$ to be added to $l_2(x)$. Through this processing, $l'_2(x)$ becomes a value in which an edge is maintained, and therefore, it is possible to prevent a blur of an edge in an output image while noise is eliminated.

Next, a case in which a relation among average values $l_{2,0}(x)$, $l_{2,1}(x)$, and $l_{2,2}(x)$ of three sub-blocks exhibits a monotonous change is considered. The monotonous change represents a pattern of average pixel values of three sub-blocks when an average pixel value $l_{2,1}(x)$ of a central sub-block is larger than an average pixel value of one of two other sub-blocks and is smaller than the other average pixel value. In this example, a target pixel is included in a smooth area. In this pattern, a value selected as $h_1(x)$ differs depending on a magnitude of a difference between $l_{2,0}(x)$ and $l_{2,2}(x)$ or an intensity of noise. Even when any one of a value $g(x)$ and a value $e'_2(x)/2$ is selected as $h_1(x)$, the following equation $$l_2(x) \le l_2'(x) \le l_{2,1}(x) \quad \text{[Math. 6]}$$

holds true, and therefore, monotonicity (i.e. smoothness of signals) in this area is not lost.

Figure 7:
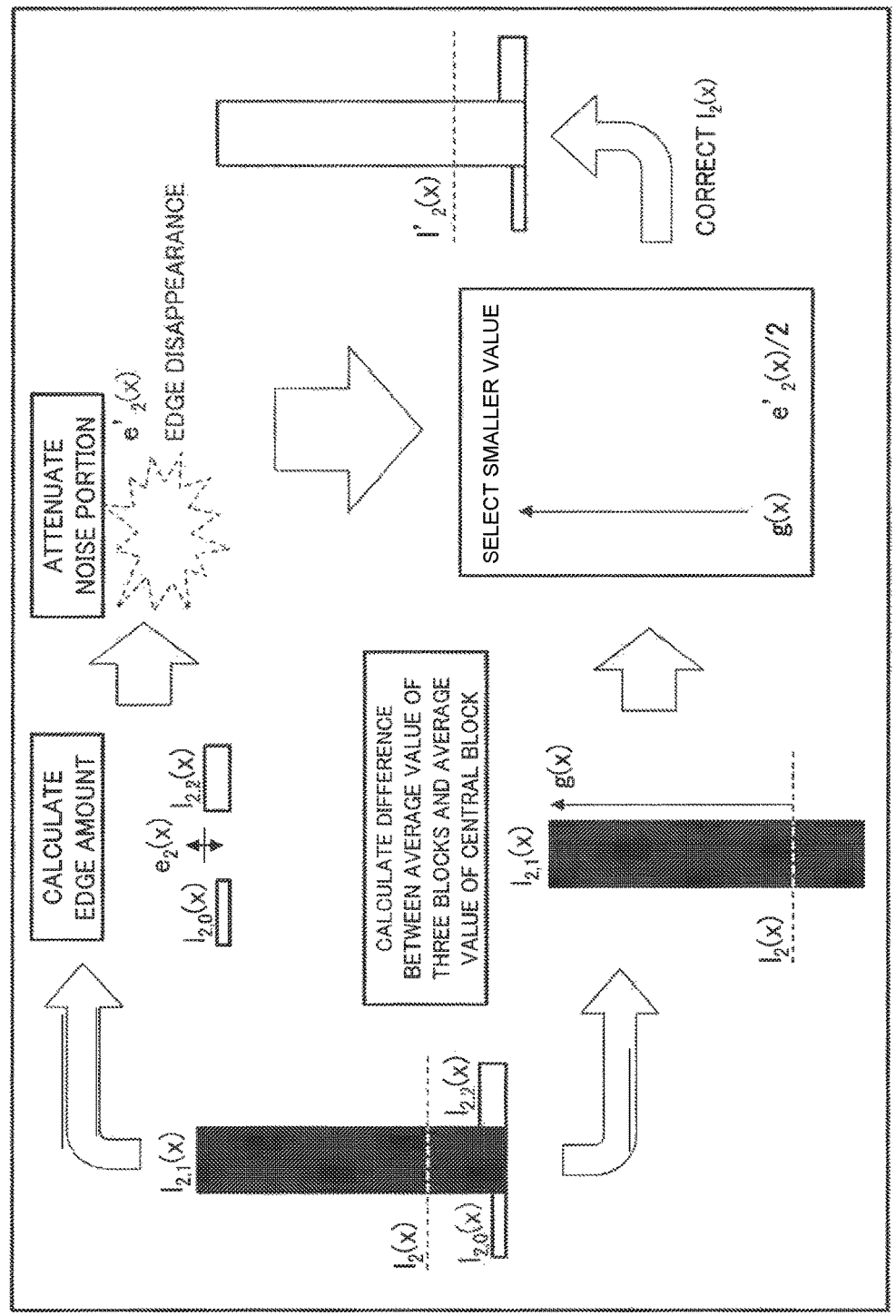
FIG. 7 is a diagram illustrating a mechanism in which an edge disappears when a central sub-block has an extreme value.

In this manner, according to the present example embodiment, it is possible to suppress noise while an edge is maintained by correction using $h_1(x)$. Note that as illustrated in FIG. 7, when an average pixel value of a central block is significantly larger (or smaller) than average pixel values of both ends, a pattern of average pixel values of sub-blocks is a concavo-convex type, and therefore, processing of erasing a peak of the central block is applied. Therefore, there is a problem that a linear edge disappears. To avoid this problem, the illumination light estimation unit 25 may calculate another correction value $h_2(x)$ and may select and use the correction value $h_1(x)$ or the correction value $h_2(x)$ as follows. The value $h_2(x)$ is calculated in accordance with the following equation on the basis of a standard deviation $\sigma_2$ of noise at the resolution concerned and $g(x)$.

[Math. 7]

$$h_2(x) = \max(|g(x)| - \alpha\sigma_2, 0.0) \quad (5)$$

Here, $\alpha$ is a coefficient indicating up to how many times of a standard deviation of noise is regarded as a noise component.

The illumination light estimation unit 25 calculates a corrected pixel value $l'_2(x)$ of a lowest resolution in accordance with following Equation (6) instead of Equation (4).

[Math. 8]

$$l_2'(x) = l_2(x) + h(x),$$

where $h(x) = \text{sign}(g(x)) \times \max(h_1(x), h_2(x)) \quad (6)$

Figure 6:
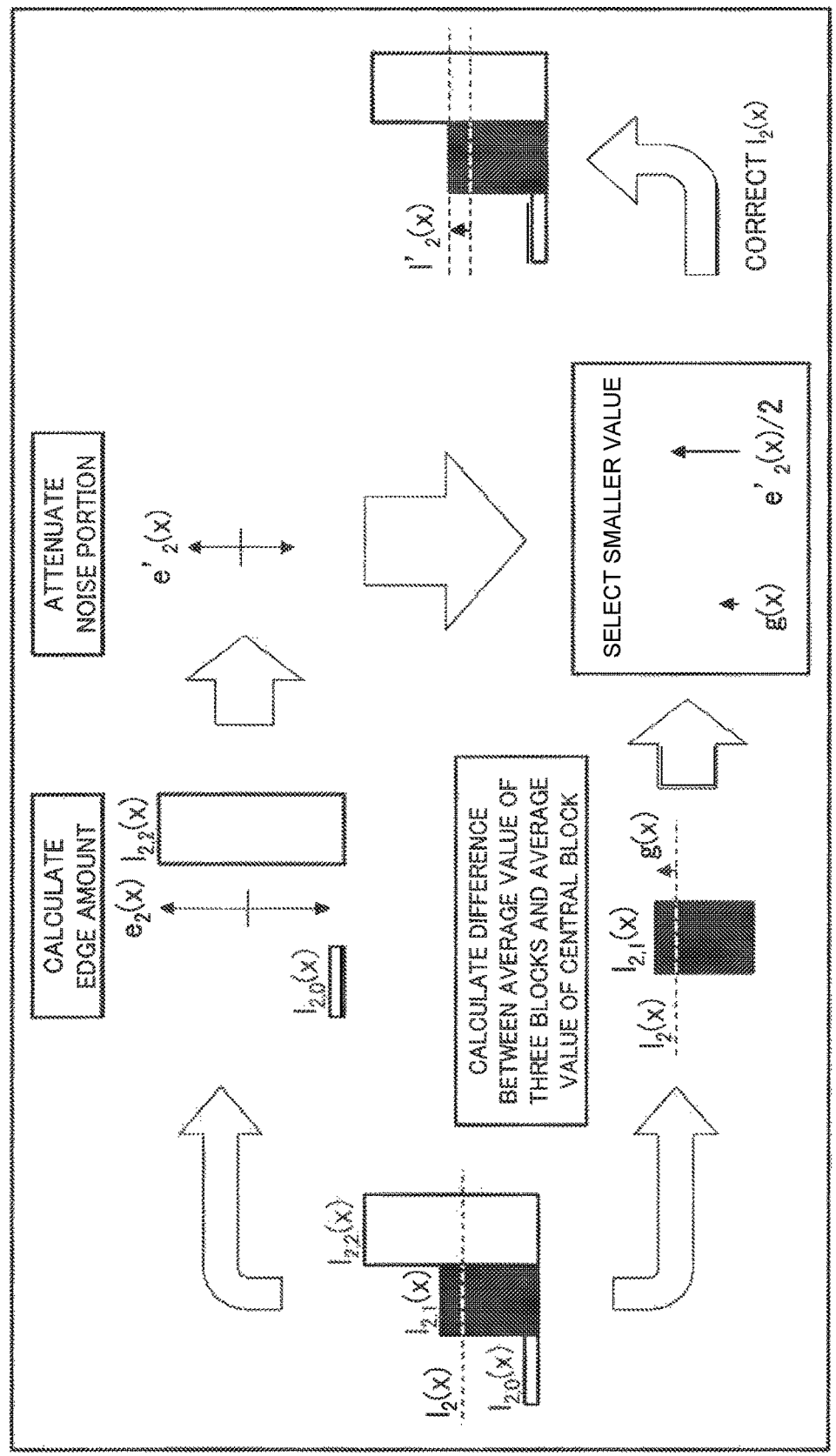
FIG. 6 is a diagram illustrating a flow of processing in a case where a relation among average pixel values of three sub-blocks exhibits a monotonous change.
Figure 8:
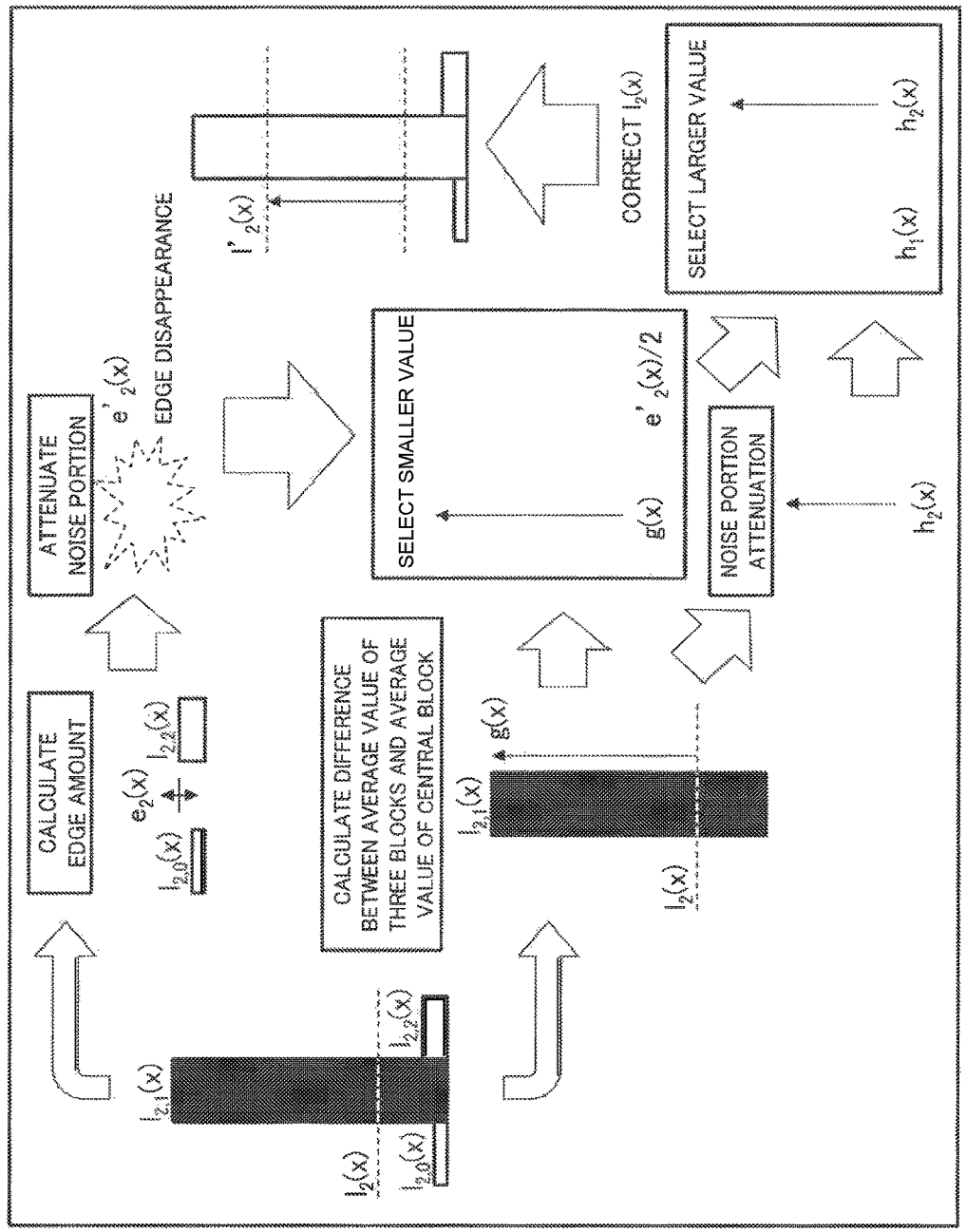
FIG. 8 is a diagram illustrating a flow of processing for maintaining an edge even when a central sub-block has an extreme value.

Depending on an intensity of a noise component, even when a central block has an extreme value (e.g. a case of a linear edge) as illustrated in FIG. 8, it is possible to leave a linear edge without being erased in a correction result image, using a correction value $h(x)$ as illustrated in Equation (6). Further, in a case as in the examples illustrated in FIG. 5 and FIG. 6, $h_2(x)$ approaches 0, and therefore, $h_1(x)$ is selected as a correction value. Therefore, influence due to introduction of $h_2(x)$ is small.

Next, the illumination light estimation unit 25 generates a pixel value $l'_1(x)$ at a next lower resolution compared with the lowest resolution on the basis of the corrected pixel value $l'_2(x)$ of the lowest resolution and an inter-adjacent resolution differential value $d_2(x)$. First, the illumination light estimation unit 25 corrects the inter-adjacent resolution differential value $d_2(x)$ in accordance with Equation $d'_2(x) = d_2(x) - h(x)$. The corrected inter-adjacent resolution differential value $d'_2(x)$ includes a high-pass component including noise. Therefore, the illumination light estimation unit 25 appropriately suppresses the noise component included in $d'_2(x)$, using a noise suppression function $F_{resid}(\cdot)$, as follows. The noise suppression unit 27 is capable of generating a pixel value $l'_1(x)$ at the next lower resolution compared with the lowest resolution by adding, as illustrated in FIG. 7, an output of the noise suppression function in which the noise component is suppressed to $l'_2(x)$.

[Math. 9]

$$l_1'(x) = l_2'(x) + F_{resid}(d_2'(x), \sigma_2) \quad (7)$$

While the noise suppression function may have various forms, the following function is used, as one example, in description of the present example embodiment.

[Math. 10]

$$F_{resid}(d, \sigma, \beta) = \text{sign}(d) \times \max(|d| - \beta\sigma, 0, 0) \quad (8)$$

Here, $\text{sign}(\cdot)$ is a function representing a plus or minus sign as described above, and $\beta$ is a parameter for adjusting correction intensity.

The illumination light estimation unit 25 generates a low-pass component $u'(x)$ in a target pixel position x by applying the above-described noise suppression processing flow also to an image having a higher resolution in order, and repeating the application up to a predetermined resolution. Note that the illumination light estimation unit 25 uses, as a pixel value of an image at a resolution other than the lowest resolution, a pixel value after correction at the resolution calculated in processing at a one-lower resolution, instead of a pixel value calculated by applying a low-pass filter to an input image.

Through the above-described processing, it is possible to extract a low-pass component of an input image without making an edge blurred. Therefore, a final low-pass component $u'(x)$, calculated in this manner, in the target pixel position x is equivalent to a processing result of an edge preservation-type non-linear low-pass filter.

Next, the illumination light estimation unit 25 estimates an illumination light component $s(x)$ in the target pixel on the basis of the low-pass component $u'(x)$. In a case in which the input image is a color image having components of three channels of RGB, assume that a low-pass component of each channel in a target pixel is defined as follows.

$$u_X'(x), X \in \{R, G, B\} \quad \text{[Math. 11]}$$

The illumination light estimation unit 25 may calculate $s(x)$ in accordance with the following equation.

[Math. 12]

$$s(x) = \max_{X \in \{R,G,B\}} (u_X'(x)) \quad (9)$$

Alternatively, the illumination light estimation unit 25 may set, as an illumination light component, a luminance value (Y component) obtained by converting a low-pass component of each channel from an RGB space to a YUV space. When the input image is a gray-scale image, the illumination light estimation unit 25 may determine $s(x)$ by Equation $s(x) = u'(x)$.

The correction amount calculation unit 26 calculates a brightness correction amount in the target pixel on the basis of the illumination light component input from the illumination light estimation unit 25 and the original image data input from the image input unit 1. Then, the correction amount calculation unit 26 outputs the calculated brightness correction amount to the noise suppression unit 27.

The correction amount calculation unit 26 may calculate a brightness correction amount by various methods. In the following description, the correction amount calculation unit 26 calculates a brightness correction amount by using a method described in Reference Document 1 (Toda, M.; Tsukada, M.; Inoue, A.; Suzuki, T., "High dynamic range rendering for YUV images with a constraint on perceptual chroma preservation," Image Processing (ICIP), 2009 16th IEEE International Conference on, pp. 1817-1820, 7-10 Nov. 2009).

In the method of Reference Document 1, a brightness of a color image is corrected in a YUV space. Therefore, when an input image is a color image having components of three channels of RGB, the input image is converted from an RGB space to a YUV space.

First, correction for a luminance component will be described. When the illumination light s(x) in a target pixel position x is smaller than a brightness $S_{tar}$ to be targeted, the correction amount calculation unit 26 calculates an index value γ(x) for correction as follows.

[Math. 13]

$$\gamma(x) = \min(a \times s(x) + b, 1.0) \quad (10)$$

The symbols a and b in Equation (10) are parameters each set by the user. The correction amount calculation unit 26 corrects, as follows, a luminance value Y(x) of an input image using the index value γ(x).

[Math. 14]

$$Y'(x) = Y(x)^{\gamma(x)} \quad (11)$$

The correction amount calculation unit 26 corrects the luminance value of the input image in accordance with the flow described above.

Note that by the above-described correction, a dark area of the image is made bright but a bright area is unchanged. Therefore, a contrast of the entire image may decrease. In this case, the correction amount calculation unit 26 may apply a contract improvement technique such as histogram stretching to a luminance value Y'(x) after brightness correction.

Next, correction of a color difference component will be described. In general, in a YUV color space, also when only a luminance component (Y component) is corrected, an apparent chroma (perception chroma) changes upon the correction. Especially in a backlight correction function, even pixels having the same luminance value differ in correction amount to a large extent in accordance with a peripheral brightness thereof, and therefore, a manner of a change in perception chroma varies. Therefore, it is necessary to correct a color difference component in accordance with a correction amount of a luminance component. The correction amount calculation unit 26 achieves the correction of a color difference component by multiplying respective color difference components U(x) and V(x) by a correction coefficient c(x), represented in Equation (12), calculated by exponentiating a ratio between luminance components before and after correction.

[Math. 15]

$$c(x) = \left(\frac{Y'(x)}{Y(x)}\right)^\rho \quad (12)$$

$$U'(x) = c(x) \times U(x) \quad (13)$$

$$V'(x) = c(x) \times V(x) \quad (14)$$

As the symbol ρ of Equation (12), ρ=0.69 is used in Reference Document 1. However, the user may provide ρ as a parameter. The correction amount calculation unit 26 corrects the color difference component of the input image in accordance with the above-described flow.

Lastly, by the correction amount calculation unit 26 converting a corrected YUV values to an RGB values, a pixel value in which brightness is corrected for the respective channels of RGB $$u_X''(x), X \in \{R,G,B\} \quad \text{[Math. 16]}$$

is obtained.

On the basis of the pixel value after brightness correction obtained in this manner, the correction mount calculation unit 26 calculates, as a brightness correction amount $$\omega_X(x), X \in \{R,G,B\} \quad \text{[Math. 17]}$$

for each of the channels, a ratio between an input pixel value $u_X(x)$ and a pixel value $u''_X(x)$ in which brightness is corrected.

[Math. 18]

$$\omega_X(x) = \frac{u_X''(x)}{u_X(x)} \quad X \in \{R, G, B\} \quad (15)$$

Note that the correction amount calculation unit 26 may constrain a range able to be taken by $\omega_X(x)$ to suppress excessive brightness enhancement.

The noise suppression unit 27 calculates a pixel value after brightness correction in which a noise component in the target pixel is appropriately suppressed, on the basis of a lowest resolution image, an inter-adjacent resolution differential image input from the difference calculation unit 22, an average pixel value for each of the sub-blocks, and a brightness correction amount. The lowest resolution image is input from the generation unit 21. The inter-adjacent resolution differential image is input from the average value calculation unit 24. The brightness correction amount is input from the correction amount calculation unit 26.

The noise suppression unit 27 executes HDR processing at the same time while using the same processing flow as the processing for calculating a low-pass component of an input image in the illumination light estimation unit 25. Note that processing in the respective color channels are the same except parameters therefor, and therefore, in the following description, a brightness correction amount for each of the color components will be referred to as ω(x). Hereinafter, description on one color channel will be made. A method of generating an image $l'_1(x)$ after noise suppression combined correction at a one-higher resolution compared with a lowest resolution on the basis of a lowest resolution image $l_2(x)$ will be described.

First, the noise suppression unit 27 multiplies a differential value between a central block average pixel value $l_{2,1}(x)$ at the lowest resolution and the lowest resolution image $l_2(x)$ by a brightness correction amount $\omega_X(x)$, and thereby calculates a differential value g(x) in which brightness correction is considered.

[Math. 19]

$$g(x) = \omega(x) \times (l_{2,1}(x) - l_2(x)) \quad (16)$$

Next, the noise suppression unit 27 multiplies an absolute value of difference between average pixel values $l_{2,0}(x)$ and $l_{2,2}(x)$ of sub-blocks of both ends by the brightness correction amount $\omega_x(x)$, and thereby calculates an edge amount $e_2(x)$ in which brightness correction is considered. Note that the noise suppression unit 27 may calculate a correction edge amount $e_2(x)$ in accordance with the following equation in which a noise intensity $\sigma_2$ at the resolution concerned and an influence of brightness correction are considered.

[Math. 20]

$$e_2(x) = \omega(x) \times \max(|l_{2,0}(x) - l_{2,2}(x)| - \sigma_2, 0, 0) \quad (17)$$

Further, the noise suppression unit 27 sets a smaller value of the differential value $g(x)$ and a value half the edge amount $e_2(x)$ as a correction value $h_1(x)$.

Next, derivation of a correction amount $h_2(x)$ for maintaining a linear edge will be described. The amount $h_2(x)$ is calculated as follows from a standard deviation $\sigma_2$ of noise at the resolution and $g(x)$.

[Math. 21]

$$h_2(x) = \max(|g(x)| - \omega(x)\alpha\sigma_2, 0.0) \quad (18)$$

A corrected lowest resolution image $l'_2(x)$ is generated by the following equation.

[Math. 22]

$$l_2'(x) = \omega(x) \times l_2(x) \times h(x),$$

$$\text{where } h(x) = \text{sign}(g(x)) \times \max(h_1(x), h_2(x)) \quad (19)$$

Lastly, the noise suppression unit 27 generates an image $l'_1(x)$ at a one-higher resolution compared with the lowest resolution by using a correction equation represented by Equation (20), on the basis of the corrected lowest resolution image $l'_2(x)$, the inter-adjacent resolution differential image $d_2(x)$, and $h(x)$ of Equation (19).

[Math. 23]

$$l_1'(x) = l_2'(x) + F_{resid}(\omega(x) \times d_2(x) - h(x), \omega(x) \times \sigma_2) \quad (20)$$

The noise suppression unit 27 generates a final corrected image by also applying the above-described noise suppression processing flow to an image having a higher resolution in order, and repeating application up to a predetermine resolution. Note that the noise suppression unit 27 uses, as an image of a resolution other than the lowest resolution, an image after correction of the resolution calculated in processing at a one-lower resolution, instead of an image calculated by applying a low-pass filter to an input image. Further, on the occasion of processing for the image of a resolution other than the lowest resolution, HDR processing for an average pixel value has already been executed. Therefore, Equation (16) and Equation (19) described above, representing processing in which brightness correction is considered, are replaced with following Equation (21) and Equation (22), respectively.

[Math. 24]

$$g(x) = \omega(x) \times l_{m,1}(x) - l_m(x) \quad (21)$$

$$l_m'(x) = l_m(x) + h(x),$$

$$\text{where } h(x) = \text{sign}(g(x)) \times \max(h_1(x), h_2(x)) \quad (22)$$

Figure 9:
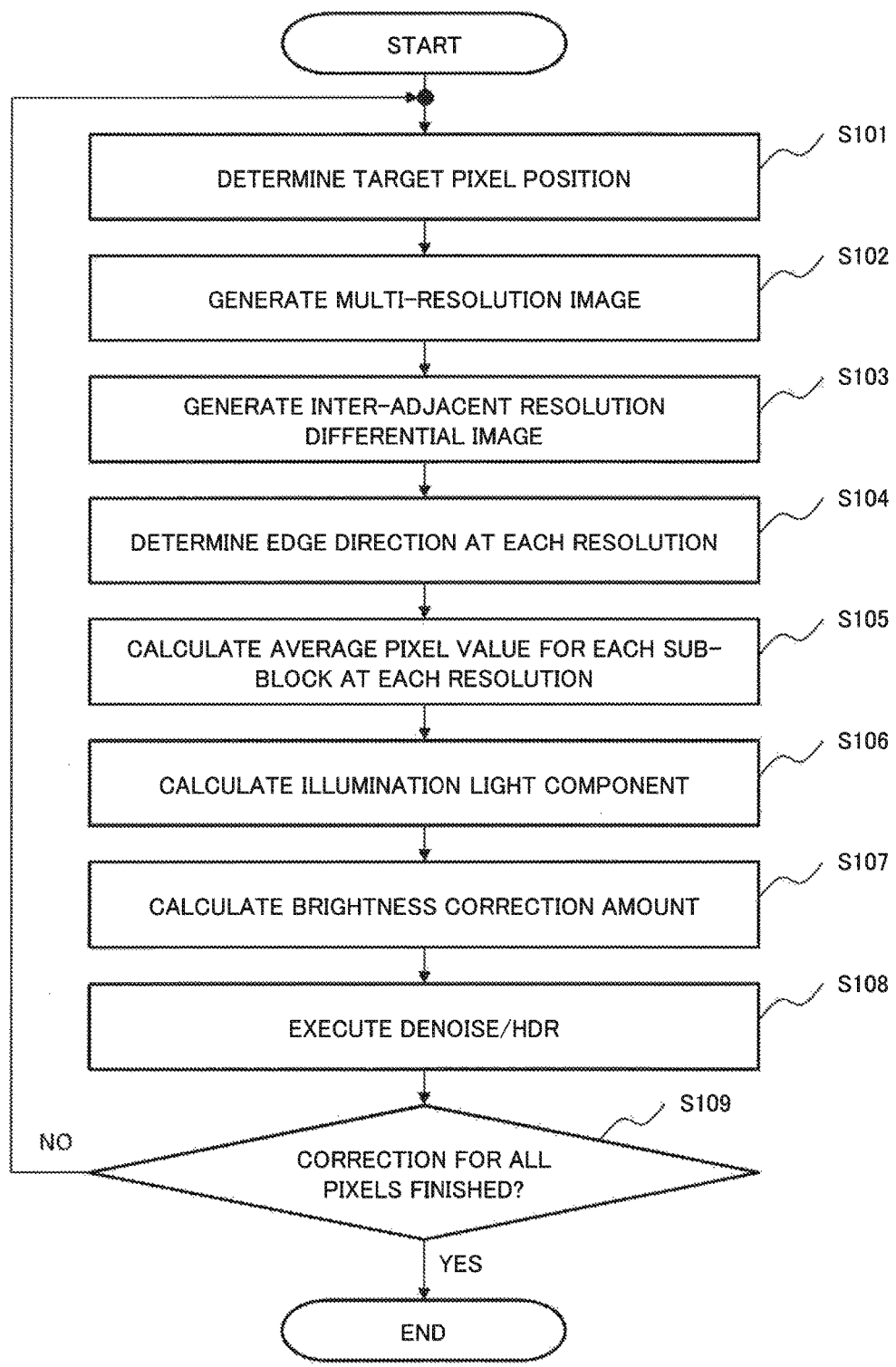
FIG. 9 is a flowchart illustrating an operation (image processing method) of the image processing device 2 of the first example embodiment of the present invention.

Next, an image processing method of the present example embodiment will be described. FIG. 9 is a flowchart illustrating an operation (an image processing method) of the image processing device 2 of the first example embodiment.

First, the generation unit 21 determines, for example, a target pixel position in an input image (step S101). The image processing device 2 repeats the processing of step S101 and processing from following step S102 to step S108 until execution for all the pixels of the input image is completed.

The generation unit 21 generates a multi-resolution image by calculating, on the basis of original image data representing the input image, average pixel values in reference pixel ranges that are pixel ranges, to be referred to, of a plurality of sizes, which become sequentially narrower (or broader) and whose centers are the target pixel (step S102).

The difference calculation unit 22 generates a differential image between adjacent resolutions on the basis of the original image data and the multi-resolution image (step S103).

The edge direction determination unit 23 determines a direction of an edge in each of the reference pixel ranges referred to for calculating the multi-resolution image (step S104).

The average value calculation unit 24 integrates a plurality of blocks, into which the reference pixel ranges referred to for calculating the multi-resolution image are divided, into three sub-blocks in accordance with an edge direction pattern. Then, the average value calculation unit 24 calculates an average pixel value for each of the integrated sub-blocks at each resolution (step S105).

The illumination light estimation unit 25 calculates an illumination light component in a position of the target pixel on the basis of a lowest resolution image, an inter-adjacent resolution differential image, and an average pixel value for each of the sub-blocks at each resolution (step S106).

The correction amount calculation unit 26 calculates a brightness correction amount in the target pixel on the basis of the illumination light component of the input image and the original image data (step S107).

The noise suppression unit 27 calculates a pixel value after brightness correction on the basis of the lowest resolution image, the inter-adjacent resolution differential image, the average pixel value for each of the sub-blocks at each resolution, and the brightness correction amount so that a noise component in the target pixel is appropriately suppressed (step S108).

When execution for all the pixels of the input image is completed (YES in step S109), the image processing device 2 terminates the processing. When the execution for all the pixels of the input image is not completed (NO in step S109), the operation of the image processing device 2 returns to step S101. Then, the image processing device 2 resets a target pixel position and executes processing again from step S102 to step S108.

Advantageous effects of the present example embodiment will be described.

According to the present example embodiment, using an edge preservation-type non-linear low-pass filter in illumination light component estimation in HDR, accuracy in illumination light component estimation is improved, and therefore, a halo can be prevented from occurring.

Further, generation of a multi-resolution image and information on the multi-resolution image resulting in a cause of a calculation cost increase is executed only once. The multi-resolution image and the information on the multi-resolution image are shared by the illumination light estimation unit 25 and the noise suppression unit 27. Therefore, an increase in calculation cost can be prevented.

Further, information of brightness correction in each pixel may be referred to in denoise, and therefore, noise amplified in brightness correction may be appropriately suppressed.

Second Example Embodiment

Figure 10:
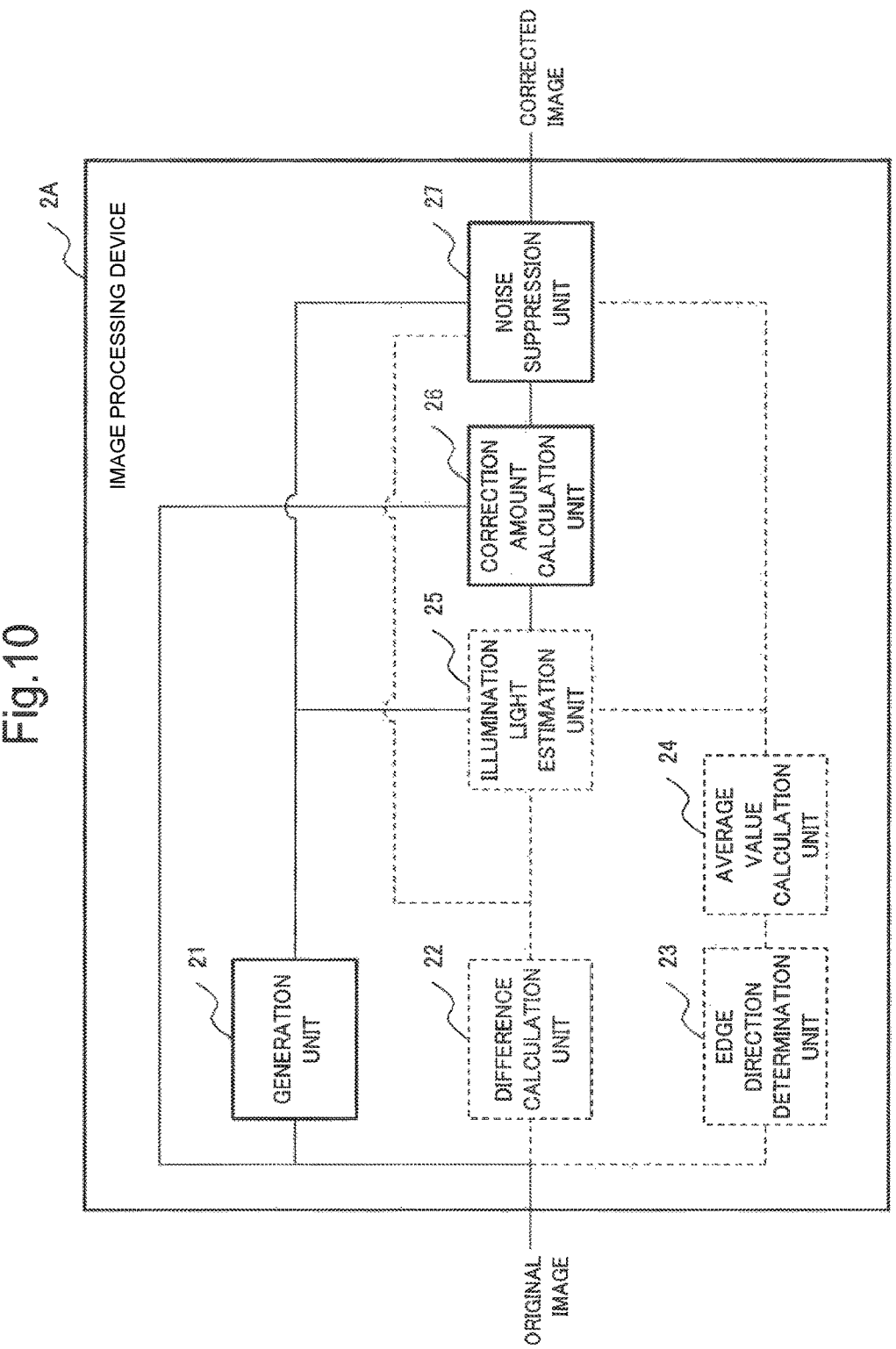
FIG. 10 is a block diagram illustrating a configuration of an image processing device 2A of a second example embodiment of the present invention.

FIG. 10 is a block diagram illustrating a configuration of an image processing device 2A according to a second example embodiment of the present invention. The image processing device 2A of the present invention includes a generation unit 21, a correction amount calculation unit 26, and a noise suppression unit 27.

The generation unit 21 generates a multi-resolution image. The correction amount calculation unit 26 calculates a brightness correction amount on the basis of a lowest resolution image of the multi-resolution image, an inter-adjacent resolution differential image in the multi-resolution image, and edge information calculated at each resolution of the multi-resolution image. The noise suppression unit 27 calculates an image after brightness correction, in which a noise component is suppressed, on the basis of the lowest resolution image, the inter-adjacent resolution differential image, the edge information, and the brightness correction amount.

The present example embodiment described above produces an advantageous effect in which noise amplification and halo generation caused by brightness correction (including HDR) may be suppressed. The reason is that the correction amount calculation unit 26 calculates a brightness correction amount on the basis of a lowest resolution image, an inter-adjacent resolution differential image in a multi-resolution image, and edge information of the multi-resolution image at a plurality of resolutions. In addition, the noise suppression unit 27 calculates an image after brightness correction, in which a noise component is suppressed, on the basis of the lowest resolution image, the inter-adjacent resolution differential image, the edge information, and the calculated brightness correction amount.

Other Example Embodiments

As apparent from the above-made description, each unit of the image processing devices according the above-described example embodiments may be configured by using hardware. Each unit of the image processing devices according the above-described example embodiments may be achieved by a computer program. In this case, by a program memory and a processor that operates by a computer program loaded in the program memory, a function and operation that are the same as those of each unit according to the image processing devices of the above-described example embodiments are achieved. The units according to the image processing devices of the above-described example embodiments are, specifically, the generation unit 21, the difference calculation unit 22, the edge direction determination unit 23, the average value calculation unit 24, the illumination light estimation unit 25, the correction amount calculation unit 26, and the noise suppression unit 27. Further, only a part of the functions of the image processing device 2 of the above-described example embodiment may also be achieved by a program memory and a processor that operates by a computer program loaded in the program memory.

Figure 11:
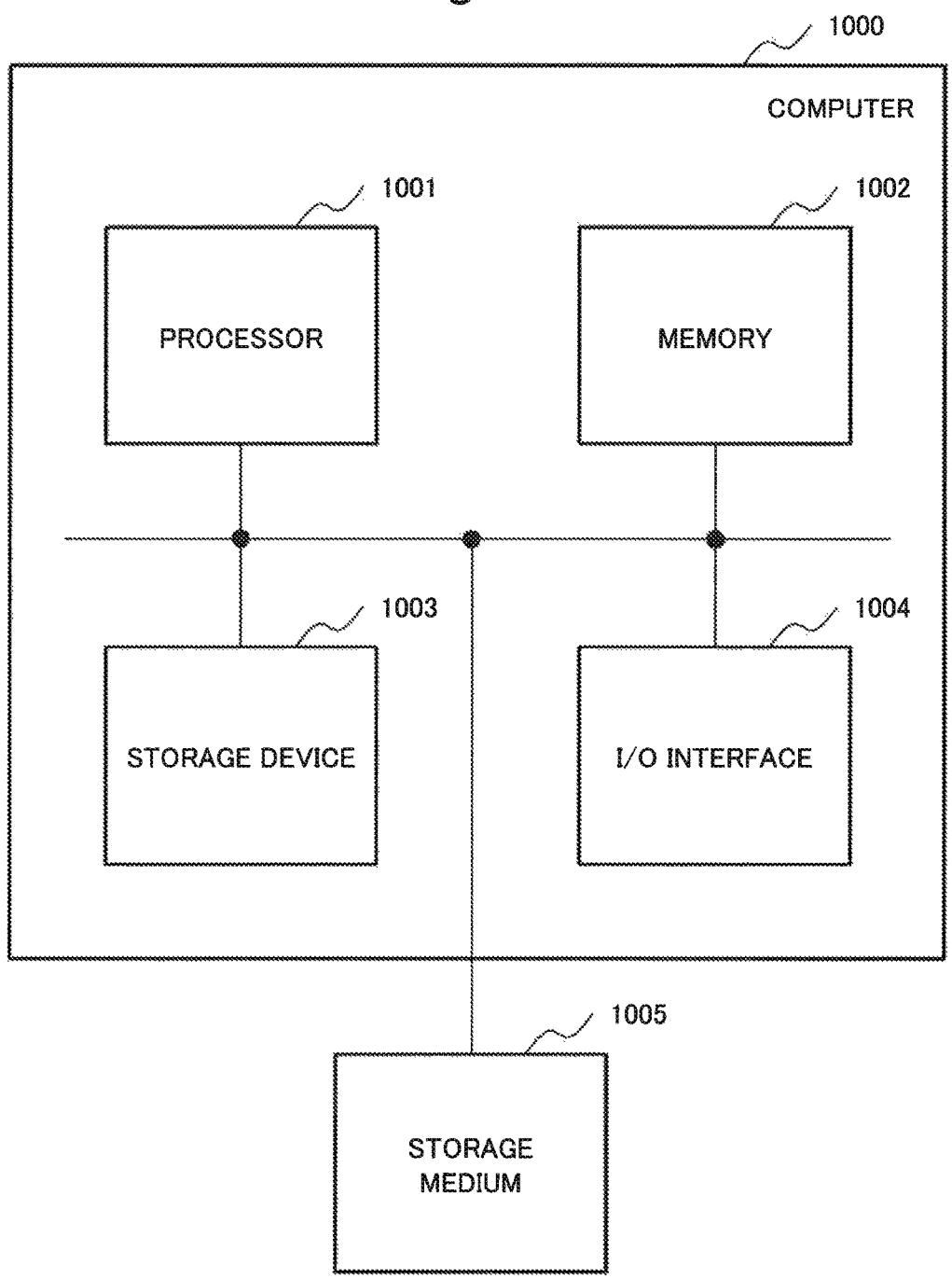
FIG. 11 is a block diagram illustrating a configuration of a computer capable of achieving the image processing device of each of the example embodiments of the present invention.

FIG. 11 is a block diagram illustrating a configuration of a computer capable of achieving the image processing device of each of the example embodiments of the present invention. Referring to FIG. 11, a computer 1000 includes a processor 1001, a memory 1002, a storage device 1003, and an I/O (Input/Output) interface 1004. Further, the computer 1000 may access a recording medium 1005. The processor 1001 loads, on the memory 1002, a program being stored on the storage medium 1005 and causing the computer 1000 to operate as the image processing device 2 or 2A. Then, the processor 1001 executes the program loaded on the memory 1002 and thereby the computer 1000 operates as the image processing device 2 or 2A. In this manner, a part or all of the units included in the image processing devices 2 and 2A are achieved by the memory 1002 in which a program that achieves functions thereof is loaded, and the processor 1001 that executes the program. The units included in the image processing devices 2 and 2A include, as described above, the generation unit 21, the difference calculation unit 22, the edge direction determination unit 23, the average value calculation unit 24, the illumination light estimation unit 25, the correction amount calculation unit 26, and the noise suppression unit 27.

Figure 12:
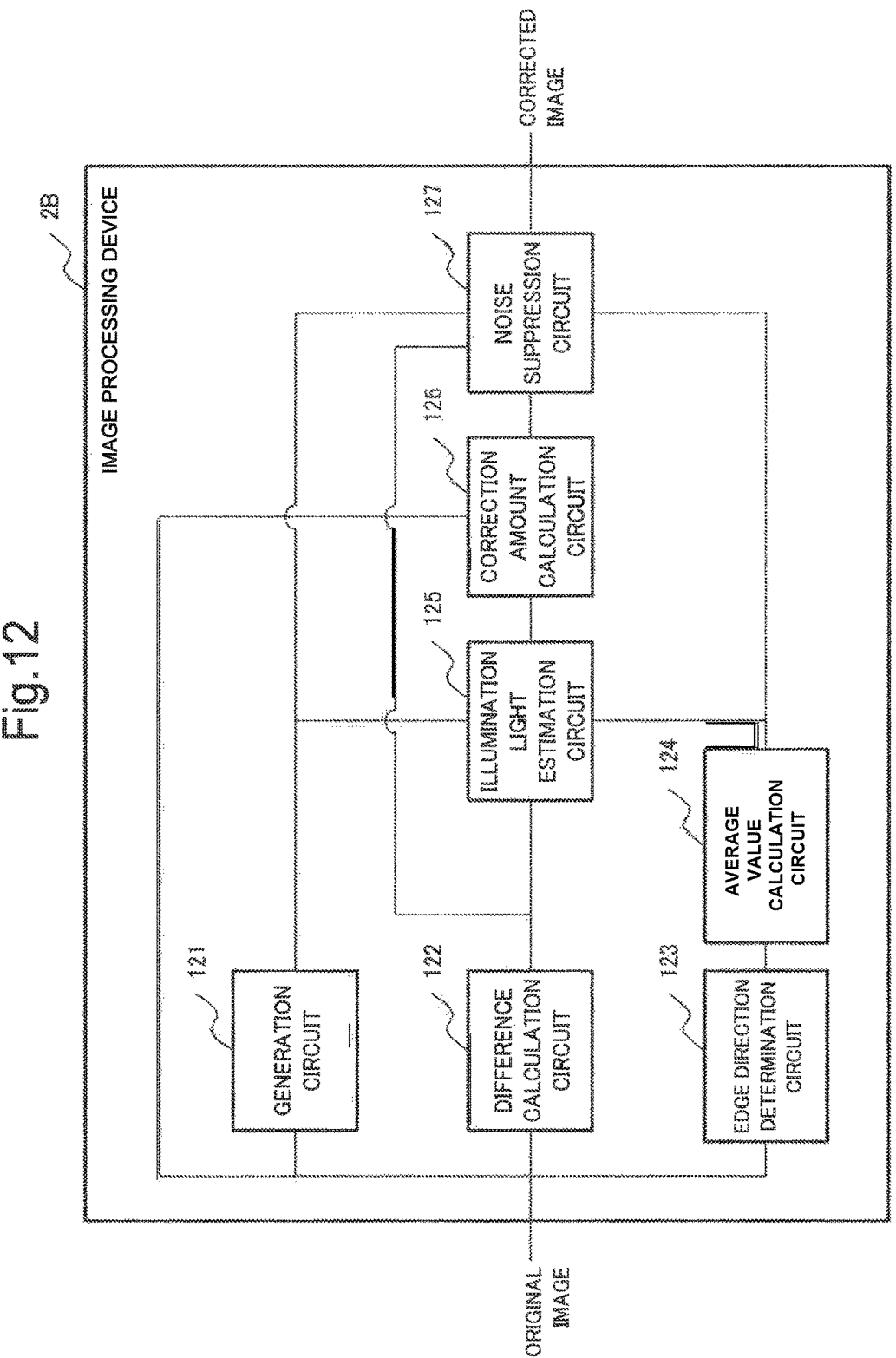
FIG. 12 is a block diagram illustrating one example of a hardware configuration of the image processing device according to each of the example embodiments of the present invention.

FIG. 12 is a block diagram illustrating one example of a hardware configuration of the image processing device according to each of the example embodiments of the present invention. An image processing device 2B illustrated in FIG. 12 includes a generation circuit 121, a difference calculation circuit 122, an edge direction determination circuit 123, an average value calculation circuit 124, an illumination light estimation circuit 125, a correction amount calculation circuit 126, and a noise suppression circuit 127. The generation circuit 121 operates as the generation unit 21. The difference calculation circuit 122 operates as the difference calculation unit 22. The edge direction determination circuit 123 operates as the edge direction determination unit 23. The average value calculation circuit 124 operates as the average value calculation unit 24. The illumination light estimation circuit 125 operates as the illumination light estimation unit 25. The correction amount calculation circuit 126 operates as the correction amount calculation unit 26. The noise suppression circuit 127 operates as the noise suppression unit 27. A part or all of the circuits included in the image processing device 2B may be achieved by a single device such as a semiconductor device or computer. A part or all of the circuits included in the image processing device 2B may be achieved by a plurality of devices such as semiconductors or computers.

Further, a part or all of the example embodiments can be described as, but not limited to, the following supplementary notes.

(Supplementary Note 1)

An image processing method including:

generating a multi-resolution image;

calculating a brightness correction amount from a lowest resolution image of the multi-resolution image, an inter-adjacent resolution differential image in the multi-resolution image, and edge information calculated at each resolution of the multi-resolution image; and calculating an image after brightness correction where a noise component is suppressed from the lowest resolution image, the inter-adjacent resolution differential image, the edge information, and the brightness correction amount.

(Supplementary Note 2)

The image processing method according to Supplementary Note 1, wherein as the edge information, a sub-block average pixel value for each of a plurality of sub-blocks into which reference pixel ranges are divided based on an edge direction determined at each resolution, the reference pixel ranges being of a plurality of sizes and being referred to when generating the multi-resolution image is used.

(Supplementary Note 3)

The image processing method according to Supplementary Note 1 or Supplementary Note 2, wherein the generating the multi-resolution image includes generating a multi-resolution image that is an aggregation of a plurality of images having different resolutions, based on reference pixel ranges of a plurality of sizes, the reference pixel ranges being pixel ranges to be referred to and becoming sequentially narrower or broader, centers of the reference pixel ranges being a target pixel, the calculating the brightness correction amount includes:

calculating, by using the multi-resolution image, inter-adjacent resolution differential information that is differential information between adjacent resolutions;

dividing, based on edge information determined at each resolution, the reference pixel ranges of a plurality of sizes, used when generating the multi-resolution image, into three sub-blocks;

calculating a sub-block average value that is an average value for each of the sub-blocks;

correcting, based on a sub-block average value at a resolution concerned, a pixel value at the resolution concerned in a target pixel, calculating, based on the corrected pixel value at the resolution concerned and an inter-adjacent resolution differential value of the resolution concerned, a pixel value at a resolution higher than the resolution concerned, and extracting a low-pass component in the target pixel by repeating correction of a pixel value at the resolution concerned in order from a pixel value at a lowest resolution until generating a pixel value of a predetermined resolution; and estimating an illumination light component in the target pixel based on the low-pass component, and calculates a brightness correction amount of an input image based on the illumination light component, and suppressing the noise component includes correcting a pixel value at the resolution concerned based on the sub-block average value at the resolution concerned and the brightness correction amount calculated in calculation of the brightness correction amount, generating a pixel value at a resolution higher than the resolution concerned based on the corrected pixel value at the resolution concerned and the inter-adjacent resolution differential information, and calculating a pixel value in the target pixel after brightness correction where a noise component is suppressed by repeating this generating in order from a pixel value at a lowest resolution until generating a pixel value at a predetermined resolution.

(Supplementary Note 4)

The image processing method according to Supplementary Note 2 or Supplementary Note 3, wherein the calculating the brightness correction amount includes calculating the brightness correction amount by calculating a low-pass component in the target pixel by repeating:

determining a correction amount for correcting a pixel value at the resolution concerned and inter-adjacent resolution differential information at the resolution concerned based on a sub-block average pixel value at the resolution concerned;

correcting a pixel value at the resolution concerned and inter-adjacent resolution differential information at the resolution concerned based on the correction amount;

suppressing a noise component based on the corrected inter-adjacent resolution differential information at the resolution concerned; and generating a pixel value at a resolution higher than the resolution concerned based on the corrected pixel value at the resolution concerned and the inter-adjacent resolution differential information whose a noise component at the resolution concerned is suppressed, sequentially from a lowest resolution to a predetermined resolution.

(Supplementary Note 5)

The image processing method according to any one of Supplementary Note 2 to Supplementary Note 4, wherein suppressing the noise component includes calculating a pixel value after brightness correction where a noise component in the target pixel is suppressed by repeating:

determining a correction amount for correcting a pixel value at the resolution concerned based on a sub-block average value at the resolution concerned and a brightness correction amount;

correcting a pixel value at the resolution concerned based on the correction amount; and generating a pixel value at a resolution higher than the resolution concerned based on the corrected pixel value at the resolution concerned and the inter-adjacent resolution differential information, in order from a pixel value at a lowest resolution until generating a pixel value at a predetermined resolution.

(Supplementary Note 6)

The image processing method according to any one of Supplementary Note 2 to Supplementary Note 5, wherein the correction amount for correcting a pixel value at the resolution concerned and the inter-adjacent resolution differential information at the resolution concerned is calculated by calculating a difference between a pixel value at the resolution and a pixel value related to the target pixel in a reference pixel range at the resolution and an edge amount obtained from three sub-block average values in the reference pixel range at the resolution, and calculating the correction amount based on the difference and the edge amount.

(Supplementary Note 7)

An image processing device including:

multi-resolution image generation means for generating a multi-resolution image;

brightness correction amount calculation means for calculating a brightness correction amount from a lowest resolution image of the multi-resolution image, an inter-adjacent resolution differential image in the multi-resolution image, and edge information calculated at each resolution of the multi-resolution image; and noise suppression means for calculating an image after brightness correction where a noise component is suppressed from the lowest resolution image, the inter-adjacent resolution differential image, the edge information, and the brightness correction amount.

(Supplementary Note 8)

The image processing device according to Supplementary Note 7, wherein as the edge information, a sub-block average pixel value for each of a plurality of sub-blocks into which reference pixel ranges are divided based on an edge direction determined at each resolution, the reference pixel ranges being of a plurality of sizes and being referred to when generating the multi-resolution image is used.

(Supplementary Note 9)

The image processing device according to Supplementary Note 7 or Supplementary Note 8, wherein the multi-resolution image generation means generates a multi-resolution image that is an aggregation of a plurality of images having different resolutions, based on reference pixel ranges of a plurality of sizes, the reference pixel ranges being pixel ranges to be referred to and becoming sequentially narrower or broader, centers of the reference pixel ranges being a target pixel, the brightness correction amount calculation means calculates, by using the multi-resolution image, inter-adjacent resolution differential information that is differential information between adjacent resolutions, divides, based on edge information determined at each resolution, the reference pixel ranges of a plurality of sizes, used when generating the multi-resolution image, into three sub-blocks, calculates a sub-block average value that is an average value for each of the sub-blocks, corrects, based on a sub-block average value at a resolution concerned, a pixel value at the resolution concerned in a target pixel, calculates, based on the corrected pixel value at the resolution concerned and an inter-adjacent resolution differential value of the resolution concerned, a pixel value at a resolution higher than the resolution concerned, and extracts a low-pass component in the target pixel by repeating correction of a pixel value at the resolution concerned in order from a pixel value at a lowest resolution until generating a pixel value of a predetermined resolution, and estimates an illumination light component in the target pixel based on the low-pass component, and calculates a brightness correction amount of an input image based on the illumination light component, and the noise suppression means corrects a pixel value at the resolution concerned based on the sub-block average value at the resolution concerned and the brightness correction amount calculated in calculation of the brightness correction amount, generates a pixel value at a resolution higher than the resolution concerned based on the corrected pixel value at the resolution concerned and the inter-adjacent resolution differential information, and calculates a pixel value in the target pixel after brightness correction where a noise component is suppressed by repeating generation of a pixel value at a resolution higher than the resolution concerned in order from a pixel value at a lowest resolution until generating a pixel value at a predetermined resolution.

(Supplementary Note 10)

The image processing device according to Supplementary Note 8 or Supplementary Note 9, wherein the brightness correction amount calculation means calculates the brightness correction amount by calculating a low-pass component in the target pixel by repeating:

determining a correction amount for correcting a pixel value at the resolution concerned and inter-adjacent resolution differential information at the resolution concerned based on a sub-block average pixel value at the resolution concerned;

correcting a pixel value at the resolution concerned and inter-adjacent resolution differential information at the resolution concerned based on the correction amount;

suppressing a noise component based on the corrected inter-adjacent resolution differential information at the resolution concerned; and generating a pixel value at a resolution higher than the resolution concerned based on the corrected pixel value at the resolution concerned and the inter-adjacent resolution differential information whose a noise component at the resolution concerned is suppressed, sequentially from a lowest resolution to a predetermined resolution.

(Supplementary Note 11)

The image processing device according to any one of Supplementary Note 8 to Supplementary Note 10, wherein the noise suppression means calculates a pixel value after brightness correction where a noise component in the target pixel is suppressed by repeating:

determining a correction amount for correcting a pixel value at the resolution concerned based on a sub-block average value at the resolution concerned and a brightness correction amount;

correcting a pixel value at the resolution concerned based on the correction amount; and generating a pixel value at a resolution higher than the resolution concerned based on the corrected pixel value at the resolution concerned and the inter-adjacent resolution differential information, in order from a pixel value at a lowest resolution until generating a pixel value at a predetermined resolution.

(Supplementary Note 12)

The image processing device according to any one of Supplementary Note 8 to Supplementary Note 11, wherein the correction amount for correcting a pixel value at the resolution concerned and the inter-adjacent resolution differential information at the resolution concerned is calculated by calculating a difference between a pixel value at the resolution and a pixel value related to the target pixel in a reference pixel range at the resolution and an edge amount obtained from three sub-block average values in the reference pixel range at the resolution, and calculating the correction amount based on the difference and the edge amount.

(Supplementary Note 13)

A program causing a computer to execute:

processing of generating a multi-resolution image;

processing of calculating a brightness correction amount from a lowest resolution image of the multi-resolution image, an inter-adjacent resolution differential image in the multi-resolution image, and edge information calculated at each resolution of the multi-resolution image; and processing of calculating an image after brightness correction where a noise component is suppressed from the lowest resolution image, the inter-adjacent resolution differential image, the edge information, and the brightness correction amount.

(Supplementary Note 14)

The program according to Supplementary Note 13, wherein as the edge information, a sub-block average pixel value for each of a plurality of sub-blocks into which reference pixel ranges are divided based on an edge direction determined at each resolution, the reference pixel ranges being of a plurality of sizes and being referred to when generating the multi-resolution image is used.

(Supplementary Note 15)

The program according to Supplementary Note 13 or Supplementary Note 14, wherein generation processing of the multi-resolution image generates a multi-resolution image that is an aggregation of a plurality of images having different resolutions, based on reference pixel ranges of a plurality of sizes, the reference pixel ranges being pixel ranges to be referred to and becoming sequentially narrower or broader, centers of the reference pixel ranges being a target pixel, calculation processing of the brightness correction amount calculates, by using the multi-resolution image, inter-adjacent resolution differential information that is differential information between adjacent resolutions, divides, based on edge information determined at each resolution, the reference pixel ranges of a plurality of sizes, used when generating the multi-resolution image, into three sub-blocks, calculates a sub-block average value that is an average value for each of the sub-blocks, corrects, based on a sub-block average value at a resolution concerned, a pixel value at the resolution concerned in a target pixel, calculates, based on the corrected pixel value at the resolution concerned and an inter-adjacent resolution differential value of the resolution concerned, a pixel value at a resolution higher than the resolution concerned, and extracts a low-pass component in the target pixel by repeating correction of a pixel value at the resolution concerned in order from a pixel value at a lowest resolution until generating a pixel value of a predetermined resolution, estimates an illumination light component in the target pixel based on the low-pass component, and calculates a brightness correction amount of an input image based on the illumination light component, and suppression of the noise component corrects a pixel value at the resolution concerned based on the sub-block average value at the resolution concerned and the brightness correction amount calculated in calculation of the brightness correction amount, generates a pixel value at a resolution higher than the resolution concerned based on the corrected pixel value at the resolution concerned and the inter-adjacent resolution differential information, and calculates a pixel value in the target pixel after brightness correction where a noise component is suppressed by repeating generation of a pixel value at a resolution higher than the resolution concerned in order from a pixel value at a lowest resolution until generating a pixel value at a predetermined resolution.

(Supplementary Note 16)

The program according to Supplementary Note 14 or Supplementary Note 15, wherein calculation processing of the brightness correction amount calculates the brightness correction amount by calculating a low-pass component in the target pixel by repeating:

determining a correction amount for correcting a pixel value at the resolution concerned and inter-adjacent resolution differential information at the resolution concerned based on a sub-block average pixel value at the resolution concerned;

correcting a pixel value at the resolution concerned and inter-adjacent resolution differential information at the resolution concerned based on the correction amount;

suppressing a noise component based on the corrected inter-adjacent resolution differential information at the resolution concerned; and generating a pixel value at a resolution higher than the resolution concerned based on the corrected pixel value at the resolution concerned and the inter-adjacent resolution differential information whose a noise component at the resolution concerned is suppressed, sequentially from a lowest resolution to a predetermined resolution.

(Supplementary Note 17)

The program according to any one of Supplementary Note 14 to Supplementary Note 16, wherein suppression processing of the noise component calculates a pixel value after brightness correction where a noise component in the target pixel is suppressed by repeating:

determining a correction amount for correcting a pixel value at the resolution concerned based on a sub-block average value at the resolution concerned and a brightness correction amount;

correcting a pixel value at the resolution concerned based on the correction amount; and generating a pixel value at a resolution higher than the resolution concerned based on the corrected pixel value at the resolution concerned and the inter-adjacent resolution differential information, in order from a pixel value at a lowest resolution until generating a pixel value at a predetermined resolution.

(Supplementary Note 18)

The program according to any one of Supplementary Note 14 to Supplementary Note 17 wherein correction amount processing of correcting a pixel value at the resolution concerned and the inter-adjacent resolution differential information at the resolution concerned calculates a difference between a pixel value at the resolution and a pixel value related to the target pixel in a reference pixel range at the resolution and an edge amount obtained from three sub-block average values in the reference pixel range at the resolution, and calculates the correction amount based on the difference and the edge amount.

(Supplementary Note 19)

An image processing method including:

generating a multi-resolution image that is an aggregation of a plurality of images having different resolutions by calculating average pixel values in reference pixel ranges of a plurality of sizes, the reference pixel ranges being pixel range to be referred to and becoming sequentially narrower or broader, centers of the reference pixel ranges being a target pixel;

calculating inter-adjacent resolution differential information that is differential information between adjacent resolutions by using the multi-resolution image;

determining edge directions of the reference pixel ranges of a plurality of sizes used when generating the multi-resolution image;

dividing the reference pixel ranges into three sub-blocks based on the edge directions;

calculating a sub-block average value that is an average value for each of the sub-blocks;

extracting low-pass component at the target pixel by repeating: calculating a difference between an average pixel value of a reference pixel range at the resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount, correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution;

estimating an illumination light component in the target pixel based on the low-pass component;

calculating a brightness correction amount of an input image based on the illumination light component; and calculating a pixel value, whose noise component is suppressed, of the target pixel after brightness correction by correcting a pixel value at the resolution concerned based on the correction amount for correcting a pixel value at the resolution concerned, the correction amount calculated in calculation of the brightness correction amount, and a brightness correction amount at the resolution concerned, by generating a pixel value at a resolution higher than the resolution concerned based on the corrected pixel value of the resolution concerned and the inter-adjacent resolution differential information, and by repeating generation of the pixel value of a resolution higher than the resolution concerned in order from a pixel value at a lowest resolution until generating a pixel value at a predetermined resolution.

(Supplementary Note 20)

An image processing device including:

a multi-resolution image generation unit that generates a multi-resolution image that is an aggregation of a plurality of images having different resolutions by calculating average pixel values in reference pixel ranges of a plurality of sizes, the reference pixel ranges being pixel ranges to be referred to and becoming sequentially narrower or broader, centers of the reference pixel ranges being a target pixel;

a difference calculation unit that calculates an inter-adjacent resolution differential value representing a difference between adjacent resolutions by using the multi-resolution image;

an edge direction determination unit that determines directions of the reference pixel ranges of a plurality of sizes used when generating the multi-resolution image;

an average value calculation unit that divides the reference pixel ranges into three sub-blocks based on the edge directions, and calculates a sub-block average value that is an average value for each of the sub-blocks;

an illumination light estimation unit that extracts low-pass component at the target pixel by repeating: calculating a difference between an average pixel value of a reference pixel range at the resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount; correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution, and estimates an illumination light component in the target pixel based on the low-pass component;

a correction amount calculation unit that calculates a brightness correction amount of an input image based on the illumination light component; and a noise suppression unit that calculates a pixel value, whose noise component is suppressed, of the target pixel after brightness correction by correcting a pixel value at the resolution concerned based on the correction amount for correcting a pixel value at the resolution concerned, the correction amount calculated in calculation of the brightness correction amount, and a brightness correction amount at the resolution concerned, by generating a pixel value at a resolution higher than the resolution concerned based on the corrected pixel value of the resolution concerned and the inter-adjacent resolution differential information, and by repeating this generation of the pixel value at the resolution higher than the resolution concerned in order from a pixel value at a lowest resolution until generating a pixel value at a predetermined resolution.

(Supplementary Note 21)

A program causing a computer to execute:

processing of generating a multi-resolution image that is an aggregation of a plurality of images having different resolutions by calculating average pixel values in reference pixel ranges of a plurality of sizes, the reference pixel ranges being pixel range to be referred to and becoming sequentially narrower or broader, centers of the reference pixel ranges being a target pixel;

processing of calculating inter-adjacent resolution differential information that is differential information between adjacent resolutions by using the multi-resolution image;

processing of determining edge directions of the reference pixel ranges of a plurality of sizes used when generating the multi-resolution image;

processing of dividing the reference pixel ranges into three sub-blocks based on the edge directions;

processing of calculating a sub-block average value that is an average value for each of the sub-blocks;

processing of extracting low-pass component at the target pixel by repeating: calculating a difference between an average pixel value of a reference pixel range at the resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount, correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution;

processing of estimating an illumination light component in the target pixel based on the low-pass component;

processing of calculating a brightness correction amount of an input image based on the illumination light component; and processing of calculating a pixel value, whose noise component is suppressed, of the target pixel after brightness correction by correcting a pixel value at the resolution concerned based on the correction amount for correcting a pixel value at the resolution concerned, the correction amount calculated in calculation of the brightness correction amount, and a brightness correction amount at the resolution concerned, by generating a pixel value at a resolution higher than the resolution concerned based on the corrected pixel value of the resolution concerned and the inter-adjacent resolution differential information, and by repeating this generation of the pixel value of a resolution higher than the resolution concerned in order from a pixel value at a lowest resolution until generating a pixel value at a predetermined resolution.

While the present invention has been described with reference to example embodiments thereof, the present invention is not limited to these example embodiments. The constitution and details of the present invention can be subjected to various modifications which can be understood by those skilled in the art, without departing from the scope of the technical ideas of the invention.

This application is based upon and claims the benefit of priority from Japanese patent application No. 2014-197732, filed on Sep. 29, 2014, the disclosure of which is incorporated herein in its entirety by reference.

REFERENCE SIGNS LIST

1 Image input unit
2 Image processing device
2A Image processing device
2B Image processing device
3 Image output unit
21 Generation unit
22 Difference calculation unit
23 Edge direction determination unit
24 Average value calculation unit
25 Illumination light estimation unit
26 Correction amount calculation unit
27 Noise suppression unit
121 Generation circuit
122 Difference calculation circuit
123 Edge direction determination circuit
124 Average value calculation circuit
125 Illumination light estimation circuit
126 Correction amount calculation circuit
127 Noise suppression circuit
1000 Computer
1001 Processor
1002 Memory
1003 Storage device
1004 I/O interface
1005 Recording medium

What is claimed is:

1. An image processing device comprising:
a memory that stores a set of instructions; and
at least one processor configured to execute the set of instructions to:
generate a multi-resolution image that is an aggregation of a plurality of images having different resolutions, based on reference pixel ranges of a plurality of sizes, the reference pixel ranges being pixel ranges to be referred to and becoming sequentially narrower or broader, centers of the reference pixel ranges being a target pixel;
calculate a brightness correction amount on the basis of a lowest resolution image of the multi-resolution image, an inter-adjacent resolution differential image in the multi-resolution image, and edge information calculated at each resolution of the multi-resolution image, by:
calculating, by using the multi-resolution image, inter-adjacent resolution differential information that is differential information between adjacent resolutions;
dividing, based on the edge information determined at each resolution, the reference pixel ranges of a plurality of sizes, used when generating the multi-resolution image, into three sub-blocks;
calculating a sub-block average value that is an average value for each of the sub-blocks;
correcting, based on a sub-block average value at a resolution concerned, a pixel value at the resolution concerned in a target pixel, calculate, based on the corrected pixel value at the resolution concerned and an inter-adjacent resolution differential value of the resolution concerned, a pixel value at a resolution higher than the resolution concerned, and extract a low-pass component in the target pixel by repeating correction of a pixel value at the resolution concerned in order from a pixel value at a lowest resolution until generating a pixel value of a predetermined resolution, and
estimating an illumination light component in the target pixel based on the low-pass component, and calculate a brightness correction amount of an input image based on the illumination light component; and
calculate an image after brightness correction where a noise component is suppressed on the basis of the lowest resolution image, the inter-adjacent resolution differential image, the edge information, and the brightness correction amount.

2. The image processing device according to claim 1, wherein
the edge information is
a sub-block average pixel value for each of a plurality of sub-blocks into which reference pixel ranges are divided based on an edge direction determined at each resolution, the reference pixel ranges being of a plurality of sizes and being referred to when generating the multi-resolution image.

3. The image processing device according to claim 2, wherein
the at least one processor further configured to:
calculate the brightness correction amount by calculating a low-pass component in the target pixel by repeating:
determining a correction amount for correcting a pixel value at the resolution concerned and inter-adjacent resolution differential information at the resolution concerned based on a sub-block average pixel value at the resolution concerned;
correcting a pixel value at the resolution concerned and inter-adjacent resolution differential information at the resolution concerned based on the correction amount;
suppressing a noise component based on the corrected inter-adjacent resolution differential information at the resolution concerned; and
generating a pixel value at a resolution higher than the resolution concerned based on the corrected pixel value at the resolution concerned and the inter-adjacent resolution differential information whose a noise component at the resolution concerned is suppressed,
sequentially from a lowest resolution to a predetermined resolution.

4. The image processing device according to claim 3, wherein
the correction amount for correcting a pixel value at the resolution concerned and the inter-adjacent resolution differential information at the resolution concerned is
a correction amount determined by calculating a difference between a pixel value at the resolution and a pixel value related to the target pixel in a reference pixel range at the resolution and an edge amount obtained from three sub-block average values in the reference pixel range at the resolution, and by calculation based on the difference and the edge amount.

5. The image processing device according to claim 2, wherein
the at least one processor further configured to:
calculate a pixel value after brightness correction where a noise component in the target pixel is suppressed by repeating:
determining a correction amount for correcting a pixel value at the resolution concerned based on a sub-block average value at the resolution concerned and a brightness correction amount;
correcting a pixel value at the resolution concerned based on the correction amount; and
generating a pixel value at a resolution higher than the resolution concerned based on the corrected pixel value at the resolution concerned and the inter-adjacent resolution differential information,
in order from a pixel value at a lowest resolution until generating a pixel value at a predetermined resolution.

6. The image processing device according to claim 1, wherein
the at least one processor further configured to:
correct a pixel value at the resolution concerned based on the sub-block average value at the resolution concerned and the brightness correction amount calculated in calculation of the brightness correction amount, generate a pixel value at a resolution higher than the resolution concerned based on the corrected pixel value at the resolution concerned and the inter-adjacent resolution differential information, and calculate a pixel value in the target pixel after brightness correction where a noise component is suppressed by repeating generation of a pixel value at a resolution higher than the resolution concerned in order from a pixel value at a lowest resolution until generating a pixel value at a predetermined resolution.

7. An image processing device comprising:
a memory that stores a set of instructions; and
at least one processor configured to execute the set of instructions to:
generate a multi-resolution image that is an aggregation of a plurality of images having different resolutions by calculating average pixel values in reference pixel ranges of a plurality of sizes, the reference pixel ranges being pixel ranges to be referred to and becoming sequentially narrower or broader, centers of the reference pixel ranges being a target pixel;
calculate an inter-adjacent resolution differential value representing a difference between adjacent resolutions by using the multi-resolution image;
determine edge directions of the reference pixel ranges of a plurality of sizes used when generating the multi-resolution image;
divide the reference pixel ranges into three sub-blocks based on the edge directions, and calculate a sub-block average value that is an average value for each of the sub-blocks;
extract low-pass component at the target pixel by repeating: calculating a difference between an average pixel value of a reference pixel range at a resolution concerned and a pixel value related to the target pixel in the reference pixel range at the resolution concerned and an edge amount obtained from three sub-block average values in the reference pixel range at the resolution concerned; calculating a correction amount for correcting a pixel value at the resolution concerned based on the difference and the edge amount; correcting a pixel value at the resolution concerned based on the correction amount; and calculating a pixel value of a resolution higher than the resolution concerned based on the corrected pixel value at the resolution concerned and an inter-adjacent resolution differential value of the resolution concerned, in order from a pixel value at a lowest resolution until generating a pixel value at a predetermined resolution;
estimate an illumination light component in the target pixel based on the low-pass component;
calculate a brightness correction amount of an input image based on the illumination light component; and
calculate a pixel value, whose noise component is suppressed, of the target pixel after brightness correction by correcting a pixel value at the resolution concerned based on the correction amount for correcting a pixel value at the resolution concerned, the correction amount calculated for estimating the illumination light component, and a brightness correction amount at the resolution concerned, by generating a pixel value at a resolution higher than the resolution concerned based on the corrected pixel value of the resolution concerned and the inter-adjacent resolution differential information, and by repeating generation of the pixel value at the resolution higher than the resolution concerned in order from a pixel value at a lowest resolution until generating a pixel value at a predetermined resolution.

8. An image processing method comprising:
generating a multi-resolution image that is an aggregation of a plurality of images having different resolutions, based on reference pixel ranges of a plurality of sizes, the reference pixel ranges being pixel ranges to be referred to and becoming sequentially narrower or broader, centers of the reference pixel ranges being a target pixel;
calculating a brightness correction amount on the basis of a lowest resolution image of the multi-resolution image, an inter-adjacent resolution differential image in the multi-resolution image, and edge information calculated at each resolution of the multi-resolution image, by:
calculating, by using the multi-resolution image, inter-adjacent resolution differential information that is differential information between adjacent resolutions;
dividing, based on the edge information determined at each resolution, the reference pixel ranges of a plurality of sizes, used when generating the multi-resolution image, into three sub-blocks;
calculating a sub-block average value that is an average value for each of the sub-blocks;
correcting, based on a sub-block average value at a resolution concerned, a pixel value at the resolution concerned in a target pixel, calculate, based on the corrected pixel value at the resolution concerned and an inter-adjacent resolution differential value of the resolution concerned, a pixel value at a resolution higher than the resolution concerned, and extract a low-pass component in the target pixel by repeating correction of a pixel value at the resolution concerned in order from a pixel value at a lowest resolution until generating a pixel value of a predetermined resolution, and
estimating an illumination light component in the target pixel based on the low-pass component, and calculate a brightness correction amount of an input image based on the illumination light component; and calculating an image after brightness correction where a noise component is suppressed on the basis of the lowest resolution image, the inter-adjacent resolution differential image, the edge information, and the brightness correction amount.

* * * * *